(12) United States Patent
Redmond

(10) Patent No.: US 11,388,867 B2
(45) Date of Patent: Jul. 19, 2022

(54) SYSTEMS AND METHODS FOR ENHANCED PRODUCTION AND MANAGEMENT OF AGRICULTURAL YIELDS

(71) Applicant: Agriburbia, LLC, Keenesburg, CO (US)

(72) Inventor: Matthew C. Redmond, Keenesburg, CO (US)

(73) Assignee: Agriburbia, LLC, Keenesburg, CO (US)

( * ) Notice: Subject to any disclaimer, the term of this patent is extended or adjusted under 35 U.S.C. 154(b) by 631 days.

(21) Appl. No.: 15/845,873

(22) Filed: Dec. 18, 2017

(65) Prior Publication Data

US 2018/0168118 A1    Jun. 21, 2018

Related U.S. Application Data

(60) Provisional application No. 62/435,461, filed on Dec. 16, 2016.

(51) Int. Cl.
| | | |
|---|---|---|
| *A01G 25/16* | (2006.01) | |
| *A01G 9/12* | (2006.01) | |
| *A01G 9/24* | (2006.01) | |
| *G06K 7/10* | (2006.01) | |
| *A01C 23/02* | (2006.01) | |
| *A01G 17/06* | (2006.01) | |
| *A01G 9/00* | (2018.01) | |
| *A01M 7/00* | (2006.01) | |
| *A01M 21/04* | (2006.01) | |
| *A01G 13/02* | (2006.01) | |
| *A01G 25/00* | (2006.01) | |

(52) U.S. Cl.
CPC ............ *A01G 25/16* (2013.01); *A01C 23/025* (2013.01); *A01C 23/028* (2013.01); *A01G 9/126* (2013.01); *A01G 9/247* (2013.01); *A01G 17/06* (2013.01); *G06K 7/10366* (2013.01); *A01G 9/006* (2013.01); *A01G 13/0231* (2013.01); *A01G 25/00* (2013.01); *A01M 7/0032* (2013.01); *A01M 21/043* (2013.01); *Y02A 40/25* (2018.01)

(58) Field of Classification Search
CPC .......... A01G 17/06; A01G 9/12; A01G 17/04; A01G 2017/065; A01G 17/10; A01G 17/02; A01G 17/00; A01G 9/122; A01G 9/126; A01G 17/08; A01G 3/0408; A01G 13/0231; A01G 25/02; A01G 13/0206; Y02A 40/237; B05B 15/622; B05B 1/20; B05B 15/625
USPC ...................... 47/45, 46, 47, 44, 70, 58.1 FV
See application file for complete search history.

(56) References Cited

U.S. PATENT DOCUMENTS

| | | | | |
|---|---|---|---|---|
| 73,750 | A | * | 1/1868 | Olendorf |
| 1,589,400 | A | * | 6/1926 | Klinglesmith ......... A01G 29/00 47/44 |

(Continued)

*Primary Examiner* — Peter M Poon
*Assistant Examiner* — Jeffrey R Larsen
(74) *Attorney, Agent, or Firm* — FisherBroyles LLP; Ian R. Walsworth

(57) ABSTRACT

The present disclosure includes systems and methods for managing, cultivating, producing, preparing and distributing agricultural products. Apparatus designed to improve agricultural yield and crop performance are also disclosed. According to one embodiment, the apparatus are individually coded or tagged for remotely configuring, monitoring and modifying one or more parameters associated with each apparatus.

19 Claims, 26 Drawing Sheets

(56) References Cited

U.S. PATENT DOCUMENTS

| | | | | |
|---|---|---|---|---|
| 1,664,019 | A | * | 3/1928 | Blackman ................. A01G 9/12 47/41.14 |
| 4,751,792 | A | * | 6/1988 | Robinson ................. A01G 9/20 47/19.1 |
| 5,941,019 | A | * | 8/1999 | Guarriello, Sr. ....... A01G 9/029 47/66.6 |
| 6,015,098 | A | * | 1/2000 | Krueger ................. B05B 1/207 239/261 |
| 2005/0145716 | A1 | * | 7/2005 | Manning ................ A01G 25/02 239/145 |
| 2009/0293353 | A1 | * | 12/2009 | Arief ..................... A01G 17/06 47/47 |
| 2014/0250854 | A1 | * | 9/2014 | Wendte ................. A01D 46/28 56/340.1 |
| 2018/0325044 | A1 | * | 11/2018 | Tilley .................... A01G 17/06 |

\* cited by examiner

SYSTEMS AND METHODS FOR ENHANCED PRODUCTION AND MANAGEMENT OF AGRICULTURAL YIELDS

CROSS-REFERENCE TO RELATED APPLICATIONS

This application claims the priority of U.S. Provisional Patent Application Ser. No. 62/435,461, filed on Dec. 16, 2016, the entirety of which is incorporated herein by reference.

FIELD OF THE INVENTION

The embodiments described herein relate generally to agricultural activities and, more particularly, systems and methods for managing production of agricultural crops and the resulting agricultural yield from one or more farm sites.

BACKGROUND OF THE INVENTION

Food production in the United States and foreign countries has experienced a number of challenges in recent years, leading to systemic (and in some instances, epidemic) food shortages. These problems have in turn led to economic difficulties within the affected communities, including with respect to supply and demand of agricultural produce and livestock. Furthermore, due in part to the emergence of smaller "micro" farms, and in part to the increased demand for locally-sourced foods and "farm to table" restaurants, grocers and food delivery services, there is a long-felt need to improve the systems and methods available to farmers and growers, and which otherwise solve problems experienced by those working in or affected by the field of the present invention.

Agricultural production on any scale requires precise planning, strategy and analysis. On many sites, agricultural growers (e.g., farmers or others involved in agricultural cultivation) are required to analyze a variety of data in order to make strategic decisions impacting their agricultural yield, often months in advance of cultivation (i.e., growing season) and harvest. In making such strategic decisions, growers are often balancing considerations such as fuel and resource costs, historical and projected weather trends, soil conditions, risks posed by pests, disease and weather events, and projected demand for and market values of agricultural commodities (i.e., crops), among other factors. Analyzing these factors and other seasonal and long-term constraints may help a grower to predict key agricultural outcomes, including crop yield, energy usage, cost and resource utilization, and farm profitability. However, if data or assumptions relied upon by the grower are flawed, an entire crop may be lost. Such analysis may also inform a grower's strategic decisions of determining crop cultivation types, methods, and timing, especially if presented to the grower in a timely, localized and discernable format.

Despite the importance of these considerations on agricultural outcomes, effective planning, analysis and strategy is difficult to achieve, especially for smaller, local producers of agricultural products. The problems currently faced by growers include a general lack of data and/or unreliable information necessary to make informed decisions and bring crop successfully to market. In addition, compiling and/or aggregating such data in a usable format is time consuming and inconvenient to the grower, who often is tasked with cultivating and harvesting crops while taking into consideration the factors identified above for the next growing season. Further, where data is available, it may not be precise enough to be useful to determine a sound strategy. For example, weather data (historical or projected) is often generalized for a large region such as a county or a state, when in reality, weather may vary significantly for an individual site. In addition, terrain features and/or soil conditions may cause data to vary in even small regions. Further, many growers and farmers do not possess the tools and capabilities to manage the collection and aggregation of data, or for that matter present the data in a usable format for making planning or strategy-based decisions.

Additionally, growers often make decisions during a specific growing season that have a profound impact on the success of a particular crop. Such decisions may include watering and nutrient schedules, adjusting when to harvest, providing supplemental fertilizer, and how to mitigate risks posed by pests, disease and weather. As a result, growers must continually monitor various aspects of their crops during the growing season and intelligently respond to changing conditions and actual production data gathered from the cultivation of crops in the grower's fields. Those conditions may include, by way of example but not limitation, weather, soil, and crop conditions. Accurately monitoring all such aspects at a granular level is difficult and time consuming. In addition, current systems and methods for completing these tasks are inadequate and/or suffer from a number of problems that can lead to loss of agricultural yield.

Analyzing and appropriately modifying production and cultivation strategy in response to local and/or regional market demand is another critical factor requiring consideration by the grower of agricultural products. Enterprises engaged in the food production and/or distribution industries, including farmers and local/regional growers, recognize the present and long-felt need to provide applications to make agricultural and food-production planning and management tasks simpler, easier to reproduce and/or scalable, and which permit the farmer/grower to share important data with those in his or her community. However, such applications are typically developed over a period of time using a great number of resources, and often lack the desired attributes of an individual grower. Additionally, application design software requires a great amount of resources, and it often takes a long time to create a custom application. In order for an agricultural enterprise, such as a Steward Farm (as defined herein) or micro-farm, to capture and supply data in an application, the enterprise must spend time and money to upgrade infrastructure and capture data relating to their yield, which may not be readily available or even accessible. Thus, there is a present need to address these problems and others described below, and otherwise enhance the systems and methods currently employed in the production and management of agricultural yield, without significantly increasing the cost and resources required to implement the same.

SUMMARY OF THE INVENTION

It is with respect to the above issues and other problems presently faced by those of skill in the agricultural arts that the embodiments presented herein were contemplated.

In one embodiment, one or more novel apparatus may be provided at a farm site to enhance the growing and cultivation of agricultural crop. In one embodiment, each row in a field may comprise a plurality of tubular-shaped apparatus, referred to elsewhere as a "trellis" and spaced apart from one another to accommodate planting of crop in the areas in between each trellis. In one embodiment, the trellises are substantially hollow and may support one or more of tags, nodes, RFID tags, signage, irrigation lines, nutrient delivery lines, protective UV coverings, protective netting, etc. The trellis, as well as other apparatus described herein, may be easily adjusted and/or coupled for use with an array, bed or box of agricultural crops.

In one embodiment, another apparatus may be used in lieu of or in addition to the trellis described in detail above, which shields underlying agricultural crop from inclement weather, birds, rodents, insects, etc. In one embodiment, the novel apparatus described herein creates a "tunnel" beneath two or more supporting arms of the apparatus, by supporting a material layer suspended over each bed or box in a field. In this manner, protection of the underlying crop may be provided temporarily or permanently at a fraction of the cost of a traditional greenhouse or similar structural arrangement.

According to embodiments, the systems and methods may comprise one or more autonomous or semi-autonomous collection and harvesting apparatus. The apparatus preferably comprise a frame supported by a plurality of wheels, which are advantageously dimensioned to fit between the rows in a field to assists with planting, growing, cultivating, harvesting and collecting crops. In certain embodiments, the apparatus is substantially automated and may comprise mechanisms for identifying specific rows, beds and boxes (such as through the identification of tags and nodes) for delivery of materials (or alternatively collection of materials) to the field, thereby improving the efficiency of the grower. In yet other embodiments, the autonomous apparatus may be airborne and controlled remotely by a user or autonomously due to programming supplied to the apparatus or due to the apparatus' ability to recognize one or more locations through the identification of tags or nodes in the field.

Embodiments presented herein further disclose an application, such as a mobile application, in part for gathering and aggregating data related to food-production, cultivation and harvesting of crops and other data sources identified herein, as well as managing numerous different agricultural or food production-related tasks without having to develop customized software applications. The application program can be based on a data paradigm that encompasses most, if not all, of the different data sets and tasks and associated tags and nodes that may be employed on a specific Steward Farm or micro-farm. The application preferably allows data or information to be input by a user for various tasks, as well as monitor the progress of various agricultural activities occurring at one or more sites.

In an additional aspect, computer-readable storage media for managing agricultural activities having computer-executable instructions embodied thereon are provided. When executed by at least one processor, the computer-executable instructions cause the processor to receive data relating to, by way of example, a specific crop, which may be located in, by way of example, a specific field. The computer-executable instructions also cause the processor to receive, for example, values associated with the crop at a particular date and time. The computer-executable instructions further cause the processor to receive data relating to cultivation and harvest of the particular crop. In an embodiment, the computer-executable instructions also cause the processor to receive data, such as weather, soil or other condition-related data, associated with the field.

In other embodiments, a method is provided for planning, cultivating and harvesting agricultural crop and other food production, including a series of steps involved in the process of bringing food production successfully to market in a given growing season and otherwise avoiding loss of food produce and/or resources used to cultivate those foods. The method may comprise steps for implementing the systems described herein, including but not limited to subroutines for planning and design of a farm site, food production facility and related apparatus and systems needed to achieve the objectives of the present disclosure. In another aspect, the method relates to building and operating the systems described herein. In another aspect, the method relates to the collection, aggregation and manipulation of data from the operation of the farm site and the various apparatus described herein.

To better understand the nature of the present disclosure, the term "Steward Farm" refers to a novel and useful farm site and related agricultural production/management systems, as described in accordance with various embodiments of the present disclosure herein.

As used herein, the term "computer-readable medium" refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a disk, magnetic tape or other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents, including successor media, in which the software and/or data implementations of the present invention are stored.

The term "mobile device" or "mobile computer" as used herein refers to any hardware device and/or software operable to engage in a computing session. For example, a mobile device can be an IP-enabled computer, a tablet computer, a cellular phone, a personal digital assistant, a laptop computer system, etc. These terms may also refer to a wearable mobile device or wearable extension of a mobile device associated therewith.

The term "network" as used herein refers to a system used by a communication platform to provide communications between mobile computers. The network can consist of one or more session managers, feature servers, mobile computers, etc. that allow communications, whether voice or data, between two users. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 3202.11g, 3202.11n, Bluetooth, or other formats or protocols.

The term "database," "archive," or "data structure" as used herein refers to any system, hardware, software, memory, storage device, firmware, component, etc., that stores data. The data model can be any type of database or storage framework stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The term "tag" or "node" as used herein refers to any chip, circuit or similar device known to those of ordinary skill in the art for identifying a discrete item associated with the systems and methods described herein. The tag or node may be accessed to obtain data associated with the particular tag or node, or alternatively a series of tags or nodes may be accessed and data obtained therefrom. According to embodiments described below, tags and nodes may comprise IoT devices, and may be configured and modified remotely by a user. While examples provided herein describe particular crop and/or yield data associated with a particular location of a micro-farm or Steward Farm, additional data may be stored and/or accessed from a tag or node as described in greater detail herein.

The term "RFID tag" as used herein refers to a specific type of tag or node (as defined above) that relies on radio frequency (RF) technology, and may comprise an integrated circuit attached to an antenna (in the form of a small coil). The term RFID tag is intended to encompass both active and passive tags (i.e., RFID tag that do not have an internal or self-supplied power source) as well as different frequencies of RFID tags (i.e., low and high frequency RFID circuits). The use of RFID tag in the singular is not meant to limit this disclosure to instances where more than one RFID tag may be present.

The term "RFID reader" as used herein refers to a radio frequency (RF) transceiver capable of reading an RFID tag, as defined above. The RFID reader may be controlled by a microprocessor or digital signal processor. According to various embodiment described herein, the RFID reader preferably captures data from one or more RFID tags, then passes that data to a mobile computer or mobile device for processing. In reading a "passive" RFID tag, the RFID reader may be configured to transmit an energy field and provide power for the passive RFID tag to respond to the reader. In certain embodiments, a mobile device or mobile computer (as defined above) may serve as either: (1) RFID readers; or alternatively, as (2) wireless encoders for one or more RFID tags. In summary, it is expressly understood that either or both mobile devices and mobile computers can be utilized to access and/or modify the data any RFID tag contains.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

Hereinafter, "in communication" shall mean any electrical connection, whether wireless or wired, that allows two or more systems, components, modules, devices, etc. to exchange data, signals, or other information using any protocol or format.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

Unless otherwise indicated, all numbers expressing quantities, dimensions, conditions, and so forth used in the specification and claims are to be understood as being approximations which may be modified in all instances as required for a particular application of the novel apparatus described herein.

The Summary is neither intended, nor should it be construed, as being representative of the full extent and scope of the present disclosure. Moreover, references made herein to "the present disclosure" "the present invention" or aspects thereof should be understood to mean certain embodiments of the present disclosure, and should not necessarily be construed as limiting all embodiments to a particular description. The present disclosure is set forth in various levels of detail in the Summary as well as in the attached drawings and the Detailed Description, and no limitation as to the scope of the present disclosure is intended by either the inclusion or non-inclusion of elements or components when describing certain embodiments herein. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below.

BRIEF DESCRIPTION OF THE DRAWINGS

The accompanying drawings, which are incorporated in and constitute a part of the specification, illustrate embodiments of the disclosure and together with the general description of the disclosure above, and the detailed description below, serve to explain the principles of the disclosure and preferred embodiments.

In the drawings.

DETAILED DESCRIPTION

The ensuing description and appended drawing figures provide embodiments only, and are not intended to limit the scope, applicability, or configuration of the claimed inventions disclosed herein. Rather, the ensuing description will provide those skilled in the art with an enabling description for implementing the embodiments. It should be understood that various changes may be made in the function and arrangement of elements without departing from the spirit and scope of the claimed inventions.

The preferred embodiments of the present disclosure are depicted in FIGS. 1-22, which are discussed in detail below. It should be understood that the drawings are not necessarily to scale. In certain instances, details that are not necessary for an understanding of the disclosure or that render other details difficult to perceive may have been omitted. It should also be understood that the disclosure is not necessarily limited to the particular embodiments illustrated in the following figures. Rather, these drawings are intended to provide examples of how to implement the systems and methods described herein according to certain embodiments, and that the full extent of the present disclosure can best be understood by review the entire specification, of which the drawings form merely a part.

Figure 1:
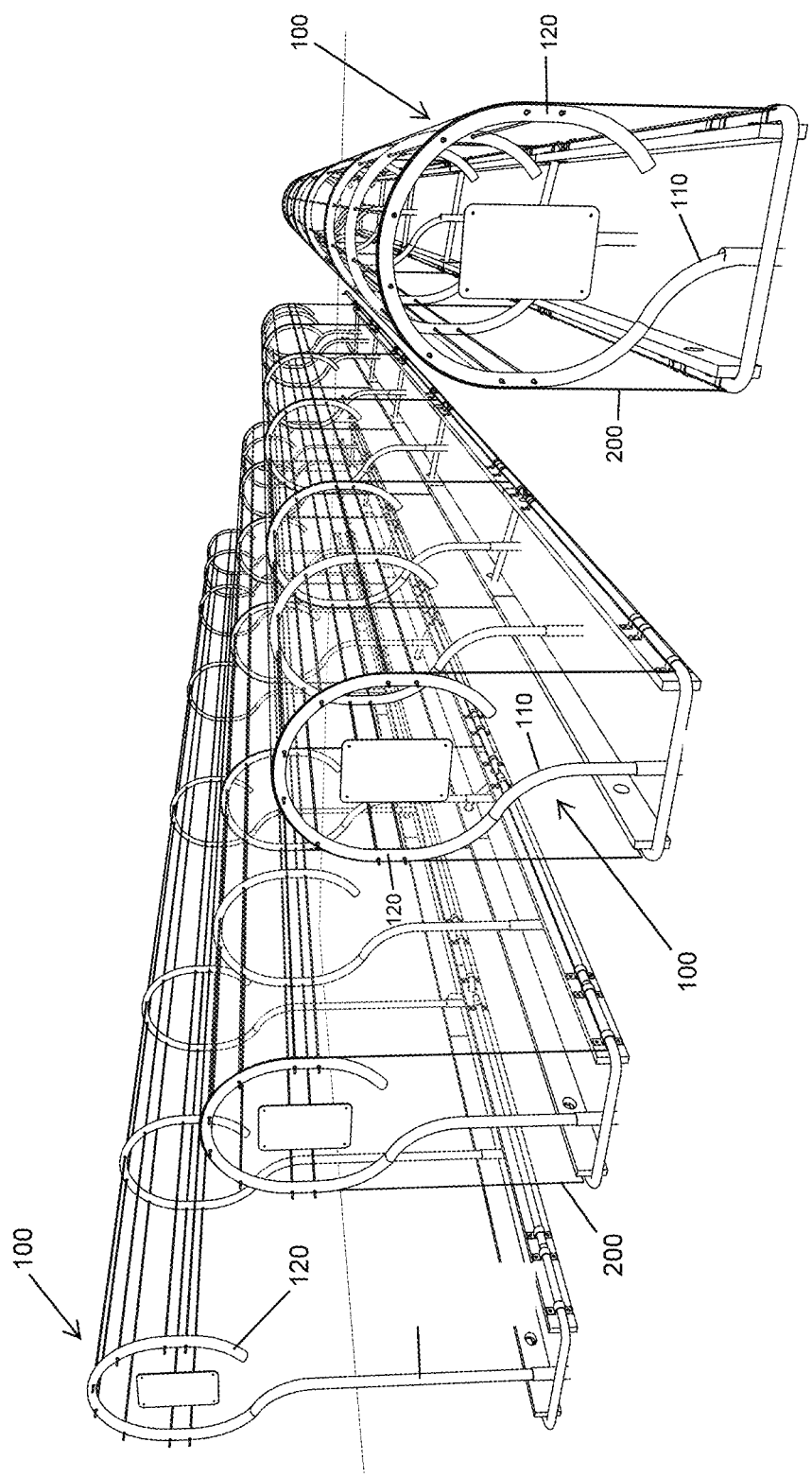
FIG. 1 is a perspective view of a field and apparatus for enhancing cultivation and production of agricultural crops according to one embodiment.

Referring now to FIGS. 1-8B, apparatus for facilitating growth and cultivation of agricultural crops according to a preferred embodiment are shown. In FIG. 1, a perspective view of a field is shown having a series of rows for cultivating agricultural crops. In FIG. 1, each row comprises a plurality of tubular-shaped apparatus 100, which will hereinafter be referred to as "lollipop trellis" in relation to their general shape and function. The lollipop trellis 100 is preferably comprised of a substantially hollow, tubular member that generally includes at least one riser portion 110 and at least one arcuate portion 120. The lollipop trellis 100 shown in FIGS. 1-8B may be formed of a single piece of material or may be supplied in sections, which permit interlocking of a tubular riser portion 110 with a desired tubular arcuate portion 120. The interlocking is preferably achieved by an interference fit, although in other embodiments the connection may comprise a locking pin, slip ring, or other mechanism for securing the first portion to a second portion. By providing two or more independent portions, a user may select a particular height, weight and thickness of riser 110 and the desired arcuate portion 120 (which may vary in size and shape) for the crop to be associated therewith.

Each lollipop trellis 100 may be adjustable in height, or have different heights, and are preferably spaced apart from any adjacent lollipop trellis 100 to accommodate planting of crop in the areas in between. In certain embodiments, each row may contain between 2 and 20 lollipop trellises 100, depending on the length of each row and the spacing between each trellis 100. Although four rows each comprising eight lollipop trellises 100 are shown in FIG. 1, it is expressly understood that a greater or lesser number of rows/trellises may exist in a specific field without deviating from the novel inventions disclosed herein.

Figure 2:
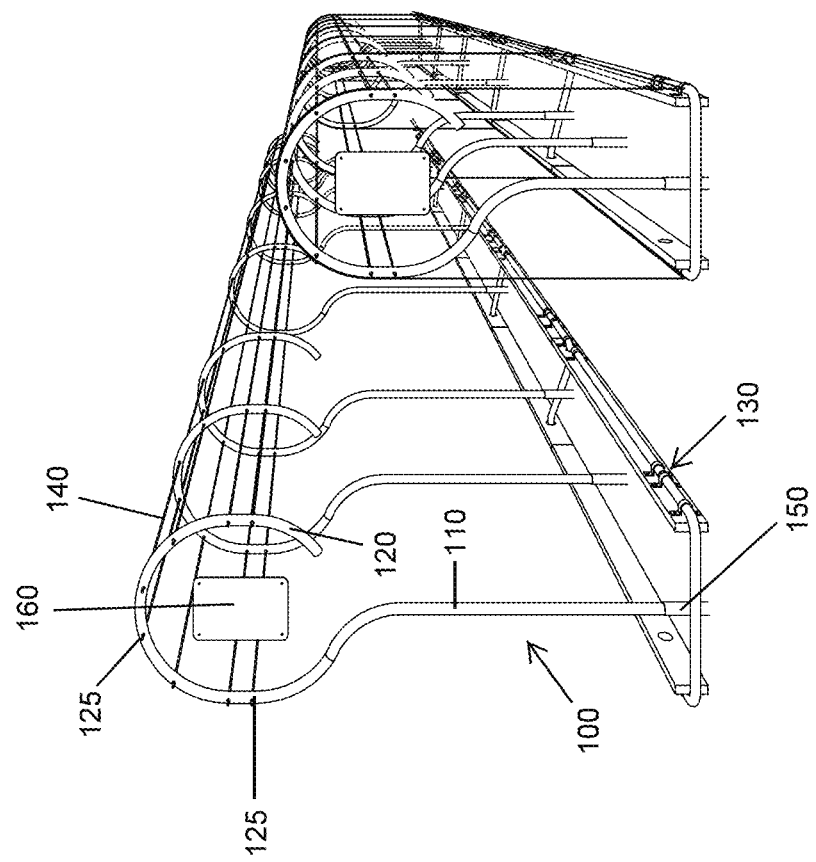
FIG. 2 is another perspective view of a field and apparatus for enhancing cultivation and production of agricultural crops according to another embodiment.
Figure 3A:
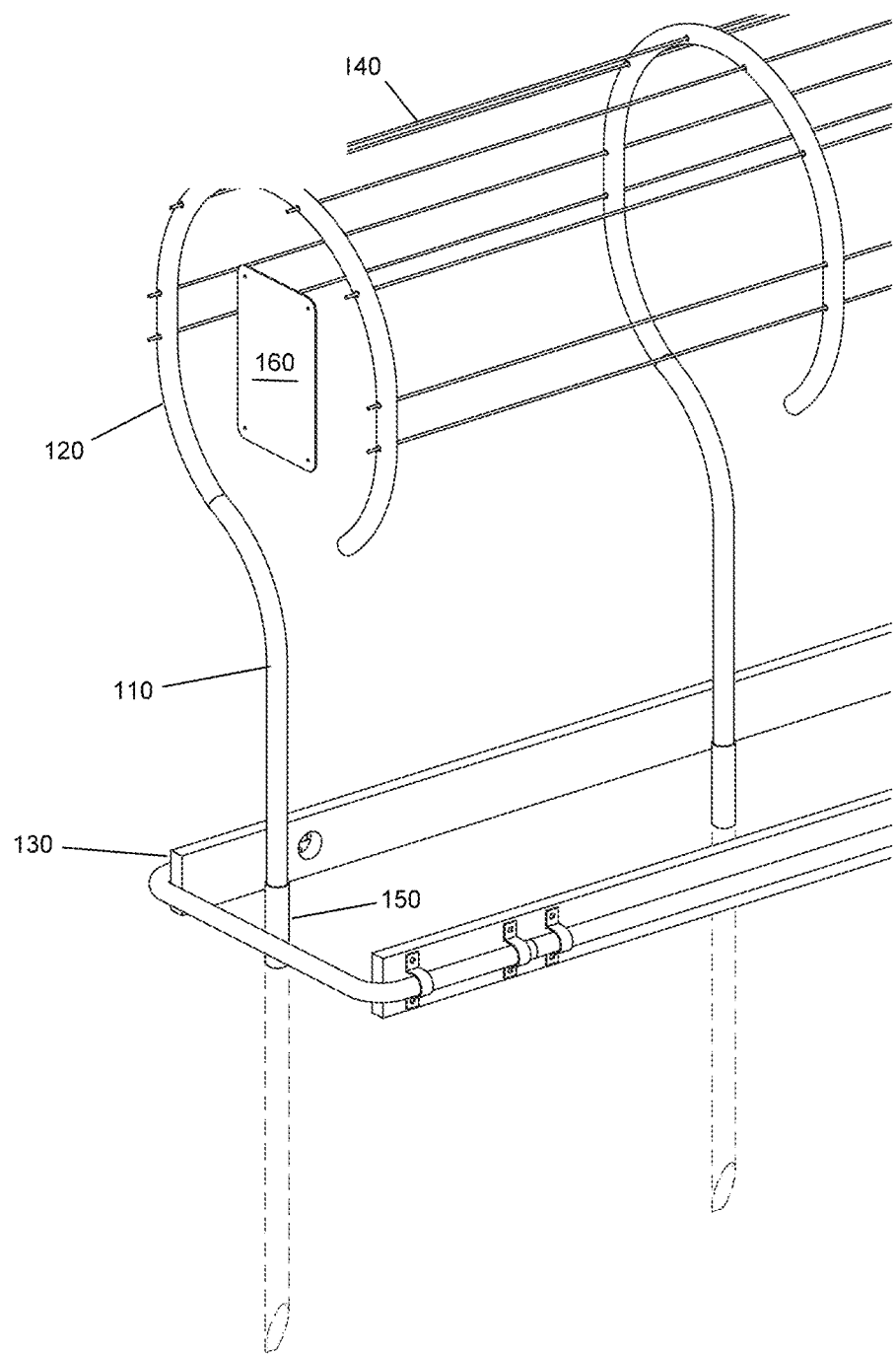
FIG. 3A is a detailed perspective view of the apparatus depicted in FIG. 2.
Figure 3B:
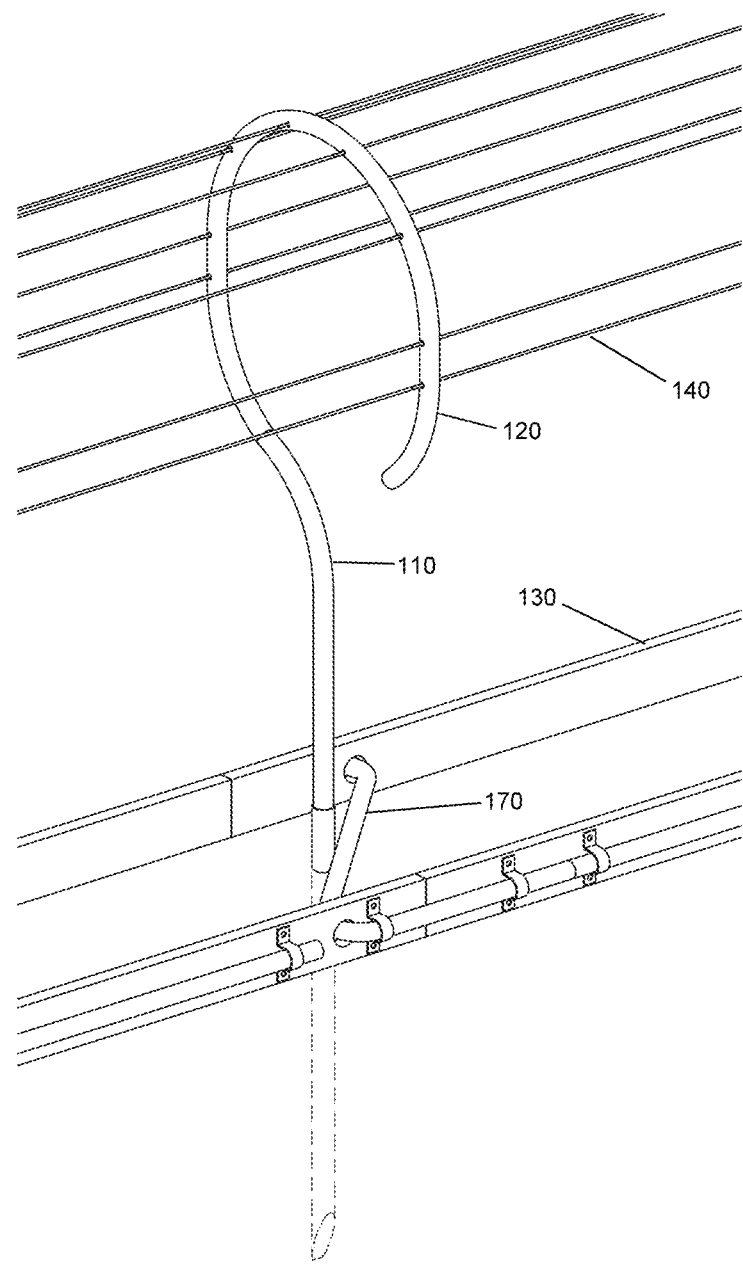
FIG. 3B is a detailed perspective view of the apparatus for enhancing cultivation and production of agricultural crops according to another embodiment.
Figure 3C:
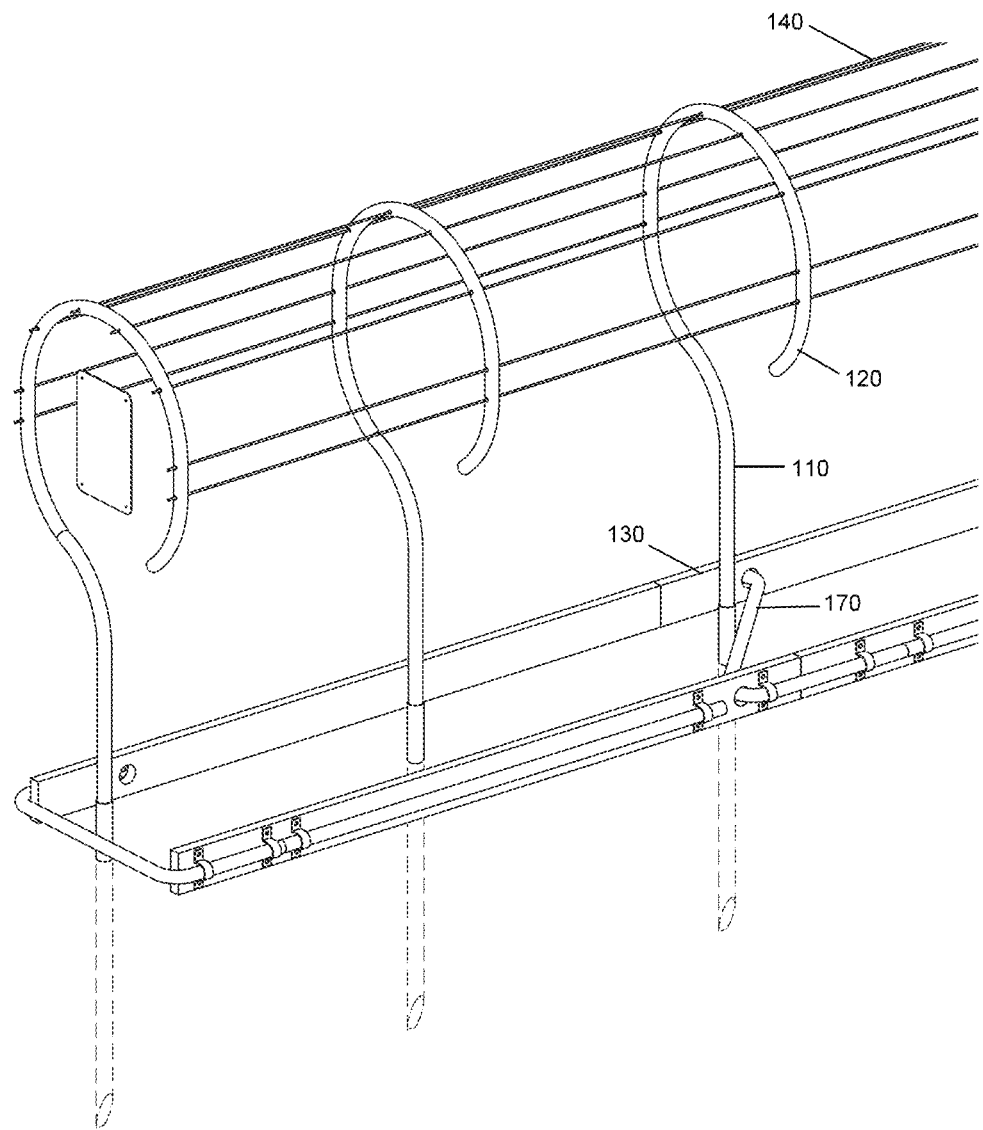
FIG. 3C is another detailed perspective view of the apparatus depicted in FIG. 3B.
Figure 3D:
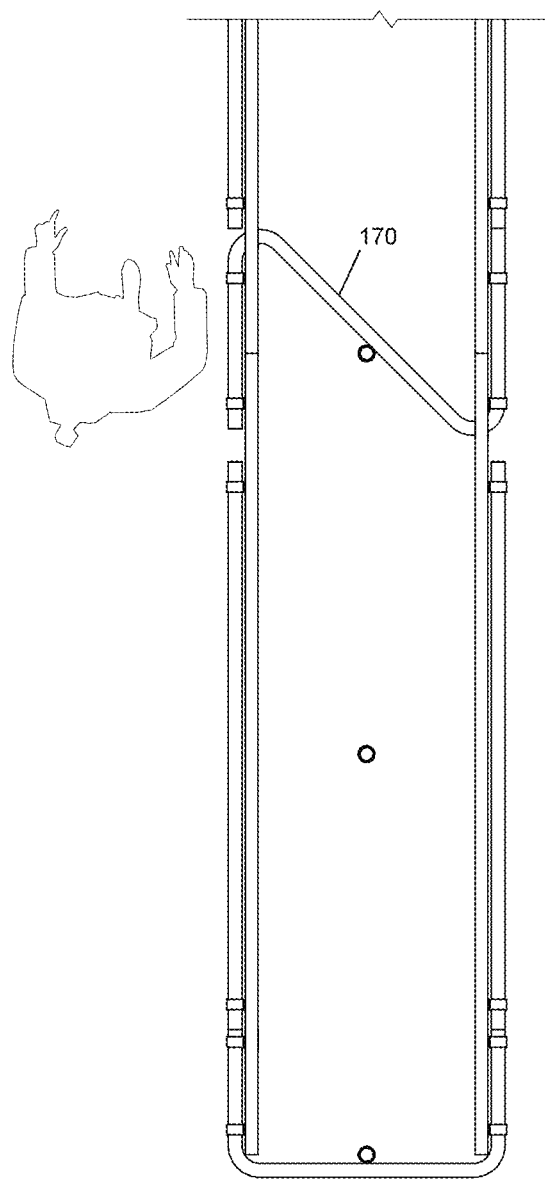
FIG. 3D is a top plan view of the apparatus depicted in FIG. 3C.

As shown in FIG. 2, a plurality of lollipop trellises 100 are preferably arranged in a row and spaced apart from one another, and may be further supported by a rigid or semi-rigid frame 130. The frame(s) 130 of the lollipop trellises 100 may further comprise at least a part of a "bed" or box for depositing soil, nutrients, fertilizer and other necessary components for a successful harvest. In addition, a row of lollipop trellises 100 may be supported by one or more cables, wires, string or other tensioning material 140 to ensure the desired orientation over the course of a growing season. As described in greater detail below, the trellis 100 preferably comprises a plurality of holes 125 spaced periodically about the arcuate member 120 of the lollipop trellis 100 for securing cables, wires or string 140, or other materials such as protective material, irrigation lines, nutrient/fertilizer lines, tags, nodes, signage, and other devices described herein.

The height of each trellis 100 may vary depending on the particular crop grown in the row associated therewith, and are preferably adjustable to accommodate growth and expansion of the associated crop over time. In one embodiment, the trellis 100 includes at least one telescoping element for increasing or decreasing the height of the trellis 100 as desired. In other embodiments, the trellis 100 is secured to the bed or frame 130 through an anchor portion 150, through which the lower end of the riser portion 110 may be placed, and thereby inserted into the ground at variable depth for establishing the desired height of the trellis 100. Further details are provided in connection with FIGS. 3A-5 below.

Figure 8A:
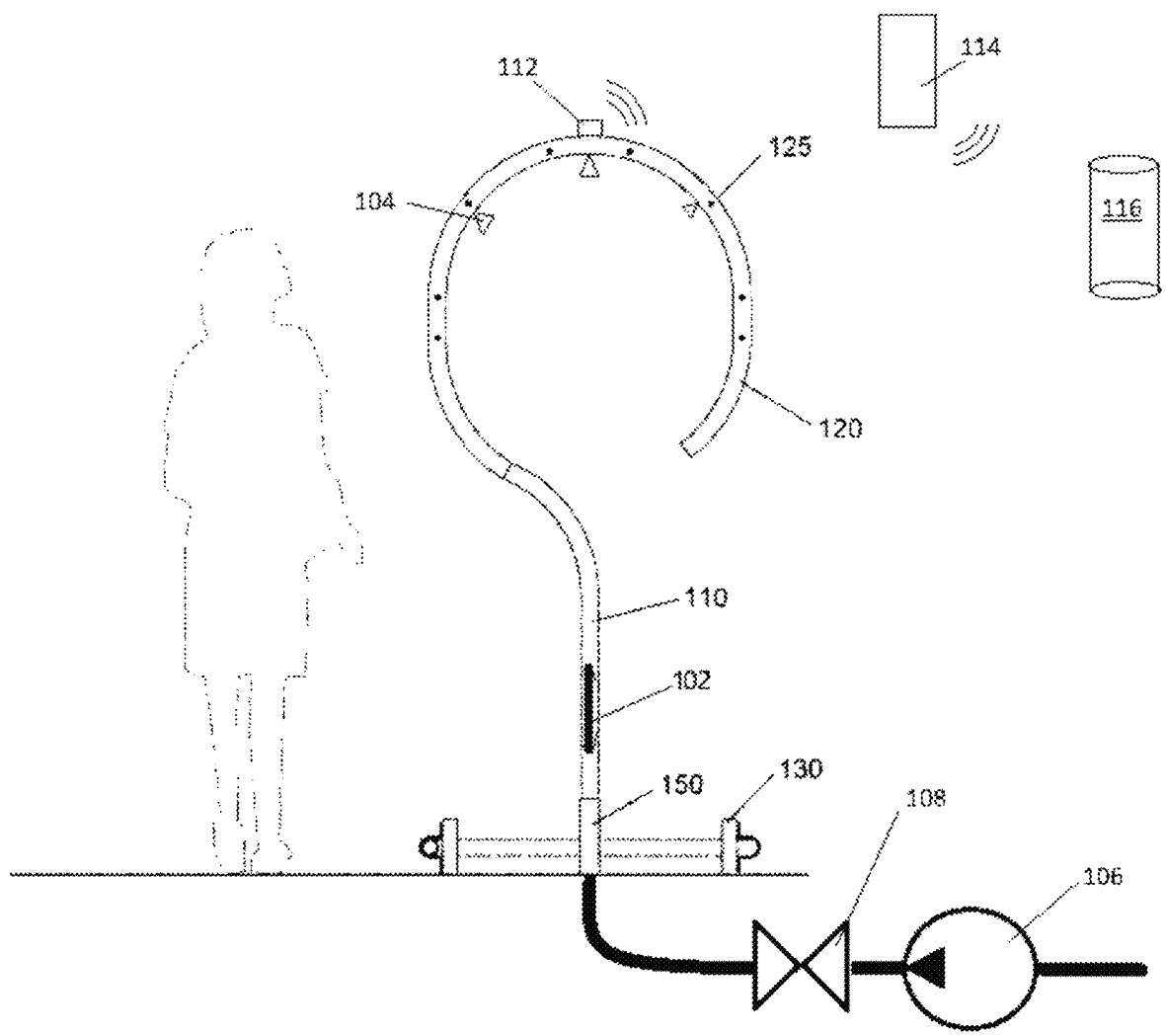
FIG. 8A is another detailed front elevation view of an apparatus for enhancing cultivation and production of agricultural crops according to another embodiment.
Figure 8B:
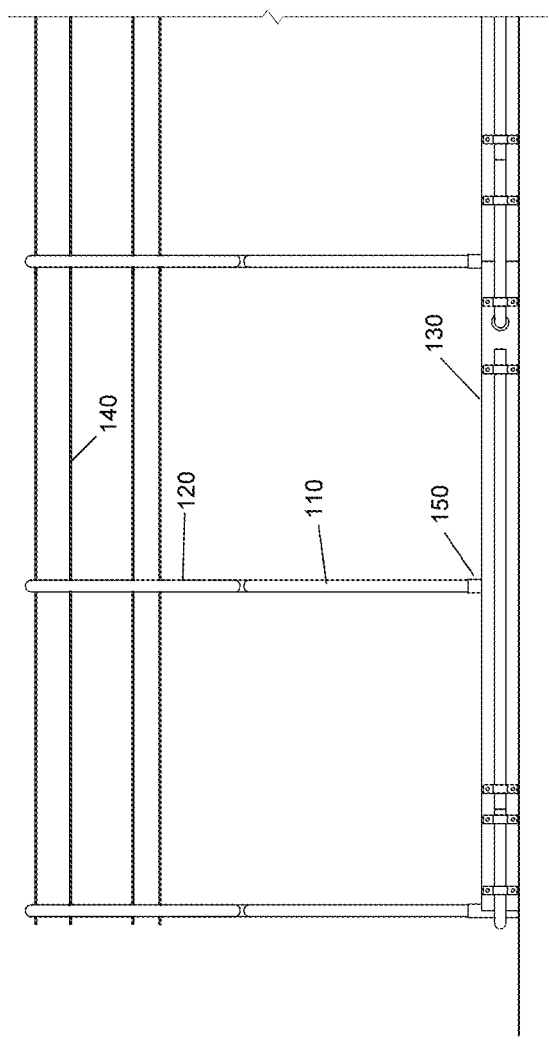
FIG. 8B is a side elevation view of the apparatus depicted in FIG. 8A.

The trellis 100 may be comprised of a variety of materials, including but not limited to aluminum, aluminum alloy, steel, stainless steel, titanium alloy, chromium alloy, and other metals or metal alloys. These materials may also include, for example, carbon fiber, ABS plastic, polyurethane, polyethylene, photo-polymers, fiber-encased resinous materials, synthetic materials, polymers, and natural materials. In one embodiment, the material of the trellis 100 is substantially recyclable and may be made from substantially naturally occurring materials The box(es) shown in FIG. 2 may be greater or less in height, and may be built with one or more inlets for attaching irrigation lines (see, 102 shown in FIG. 8A) for scheduled watering of the crops contained in the box(es). Preferably, each box has at least one inlet capable of receiving an irrigation line, and may further comprise a quick connect/disconnect for ease of attachment. The irrigation line(s) may vary in length and width, depending on the quantity of water distributed to the various boxes in the field. Other supply lines may similarly be incorporated with the box(es) and/or trellises 100 so that water, nutrients, fertilizer, insecticide, pesticide, etc. may be delivered to each bed or any specific bed. As shown in FIG. 8A, each line may comprise one or more pumps 106 and associated valves 108 for supplying material through the supply lines and to the beds. The box(es) preferably include a frame 130 having surfaces for tacking ground cover or protective material over the material in each bed as needed.

The rows and boxes shown in FIG. 1 are spaced apart, according to a preferred embodiment, which allows growers to access any of the boxes and associated crops in a particular row. Ideally, the rows are spaced apart at a distance sufficient to permit one or more collection and harvesting apparatus to become situated between each row without difficulty. In certain embodiments, the areas between each row may further comprise a track or rail for facilitating apparatus transported between each row during the growing or harvesting seasons. Additional details regarding this particular embodiment are described in greater detail below.

Referring now to FIG. 2, one or more lollipop trellises 100 may advantageously include signage 160 bearing indicia for designating the crop planted in the row where the trellis 100 is situated. The trellis 100 is advantageously shaped to permit such indicia to be prominently displayed at the head of each row and/or periodically throughout each row as desired. Signage 160 may provide information to a grower for quickly identifying the status of the crop located within the row associated therewith. The information may include crop historical data, such as planting, feeding, pesticide, fertilization and watering history, and may further comprise individual revisions and adjustments made by an individual grower. Furthermore, the information may include current or historical temperature, humidity, moisture content, etc. for assisting with crop cultivation. In a preferred embodiment, the information associated with the signage 160 is accessible both locally and remotely, as described in greater detail below.

Signage 160 may further include information such as crop type, quantity, variety, planting date, inspection date, fertilization schedule, soil condition, water content, cultivation or harvest schedules, or other information useful to the grower. The signage 160 may also include one or more barcodes, nodes or tags, such as an RFID tag, which may be coded with any of the above-referenced information, and may be accessed and or updated by one or more autonomous or semi-autonomous apparatus described herein.

Each lollipop trellis 100 is preferably substantially hollow and permits, for example, wire to be fastened to portions of each trellis 100 for providing further support and, if desired, tensioning between each adjacent trellis as shown in FIG. 3. The trellis 100 also permits signage 160, such as the signage described in the preceding paragraphs, to be easily suspended from or attached to each trellis 100 as needed. The riser portion 110 of the trellis 100 preferably comprises a lower edge that is angled or otherwise shaped to penetrate a ground surface, so that the riser portion 110 may be driven into the ground where a crop is to be planted. To provide further support to the trellis 100, the riser portion 110 may be further secured to the ground and/or frame of the bed by way of a substantially hollow anchor element or portion 150. The anchor element 150 in one embodiment is approximately 2 inches in diameter, and is sized to extend 4-8 inches above grade. In one embodiment, the anchor element 150 comprises a section that is complementary to the frame 130 of the bed, such that the anchor element 150 may be placed nearly flush against the frame 130 and secured thereto.

The trellis 100 may be comprised of a riser portion 110 and an arcuate portion 120 as shown in FIG. 3. In a preferred embodiment, the riser 110 and arcuate portions 120 are approximately 1⅛ inches in diameter, and formed of 14-gauge aluminum or equivalent material. Wire, cable, string or other suitable tensioning material 140 may be placed through holes 125 in the trellis 100 for securing the trellis 100 relative to a row or array of other trellises 100. The wire 140 in a preferred embodiment is 3/16 inch tensioning wire, which may be secured at a row-end trellis 100 by bolts, wire nuts or equivalent connectors. The wire, cable or string 140 may be used to support growing crop, such as vine crops, or may be used to hang material over the crop to protect from birds, insects, inclement weather conditions, and other undesired elements described below.

Referring to FIGS. 3A-3D and 5, the trellis 100 may further be supported by the frame 130 of the bed and/or one or more bracing members 170. The bracing members 170 serve to further stabilize each trellis 100 and prevent bowing or collapse of any trellis 100 in a particular row, particularly after the trellises 100 are loaded with vine growing crops and/or protective sheeting, signage 160, and other devices described herein. The bracing members 170 may be placed diagonally between the top of the arcuate portion 120 of one trellis 100 and the lower end of the riser portion 110 of an adjacent trellis 100, as shown. Alternatively, the bracing members 170 may be place near-horizontally between adjacent trellises 100, or may be placed diagonally between the trellis 100 and a ground surface or a separate portion of the bed frame 130. Variations on this arrangement of bracing members 170 is considered within the scope of the present disclosure.

The riser portion 110 of the trellis 100 may comprise one or more telescoping sections. In one embodiment, a first section is permitted to telescope approximately 24-36 inches beyond a minimum height of the riser portion, and may be locked in the desired height by way of a locking pin, slip ring or other coupling positioned between the first telescoping section and the lower section of the riser 110.

One additional benefit of using wire supports 140 between each trellis 100 is that material 200 may be placed over each trellis 100 and the suspending cable/wire 140 strung in between, and thereby supported over the crop growing in the row underneath the material. In one embodiment, the material 200 may be a clear, ultraviolet (UV) treated polyethylene sheet of material, which serves to insulate the underlying crop from various elements (including drops in temperature) or from pests (including birds and certain insects), while at the same time permitting sunlight to penetrate the material 200. This material 200 may be advantageously fastened to each trellis 100 to prevent the material from becoming displaced due to wind or other weather elements, or from pests such as birds, raccoons and other animals.

In another embodiment, the trellis 100/wire 140 structure supports material 200 such as a protective netting, shade cloth or equivalent material. More particularly, a netting, shading or other type of material may be used to protect the underlying crop and exclude pests, and which otherwise provides the benefits and achieves the objectives described above in connection with the lollipop trellis 100. The netting, shading or other material 200 is preferably stretchable, so that the netting can stretch to accommodate growth of underlying crop or expansion of growing beds in a field.

Figure 4:
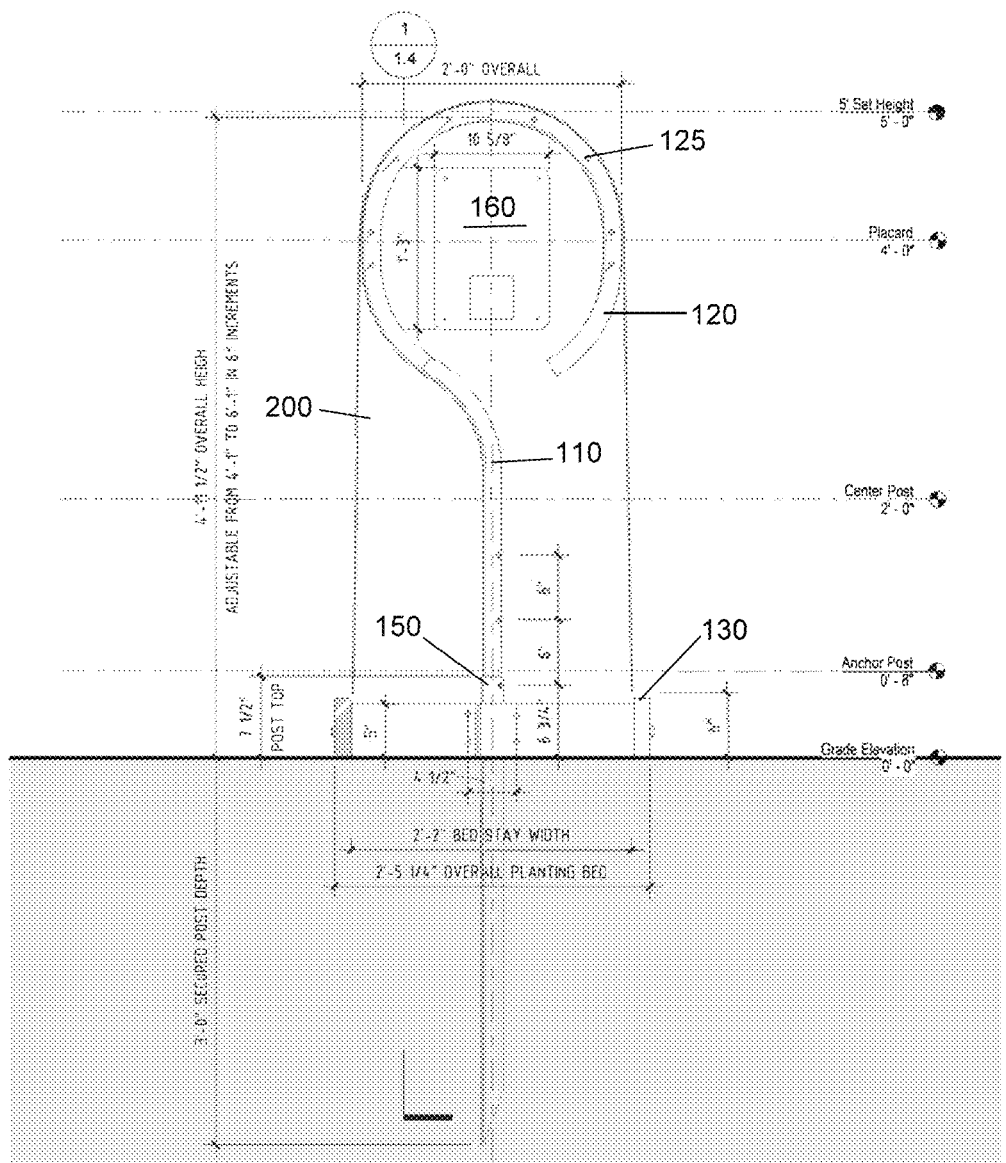
FIG. 4 is a detailed front elevation view of the apparatus depicted in FIG. 2.
Figure 5:
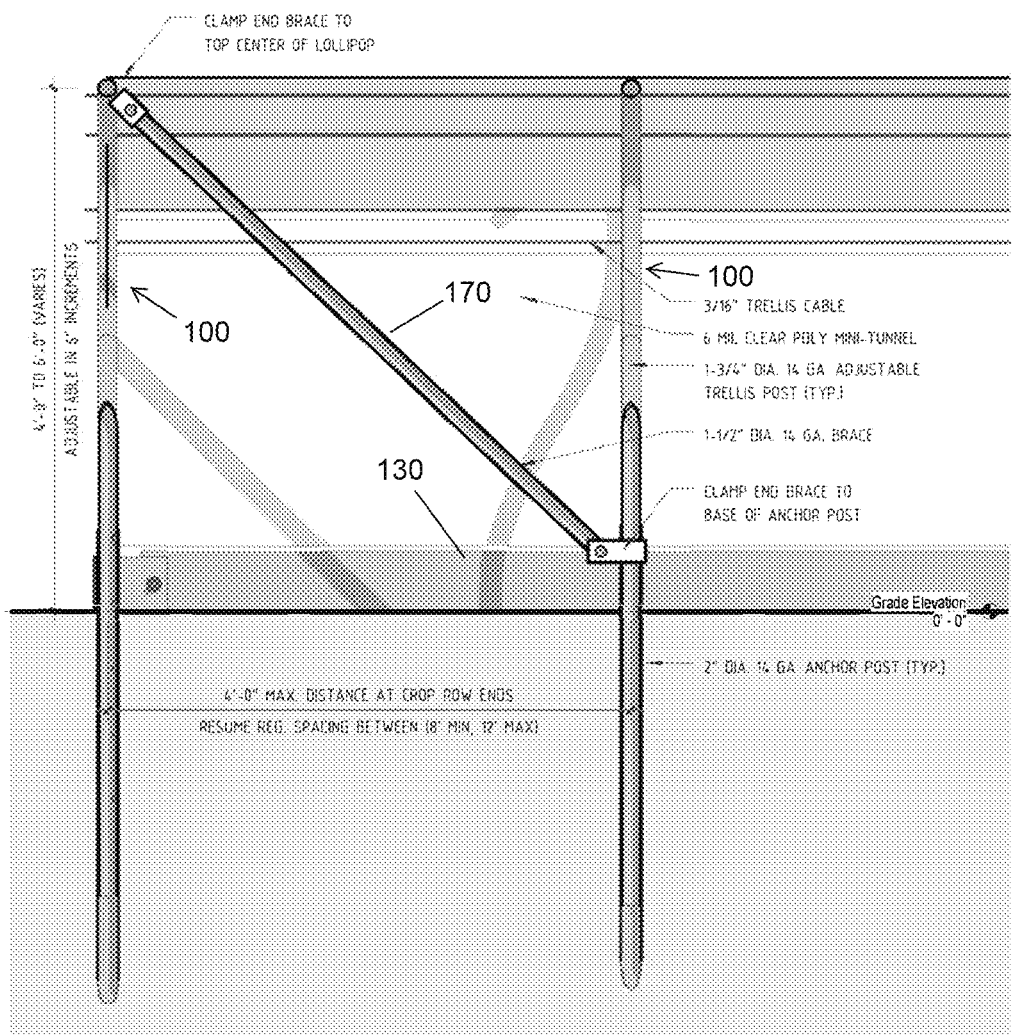
FIG. 5 is a detailed side elevation view of the apparatus depicted in FIG. 2, wherein a portion of a riser has been removed.
Figure 6:
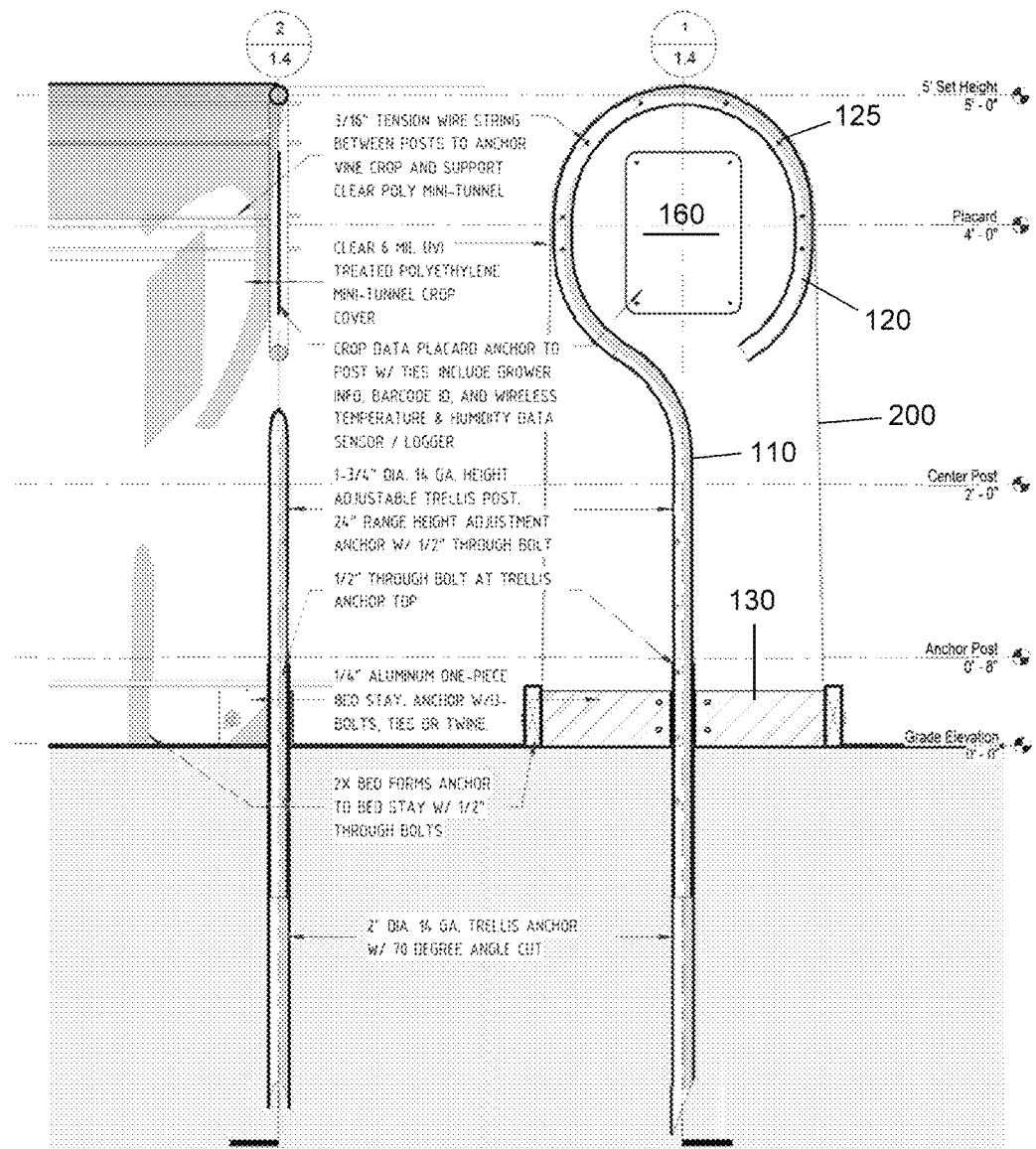
FIG. 6 is a detailed front elevation and profile view of the apparatus of FIG. 2.
Figure 7:
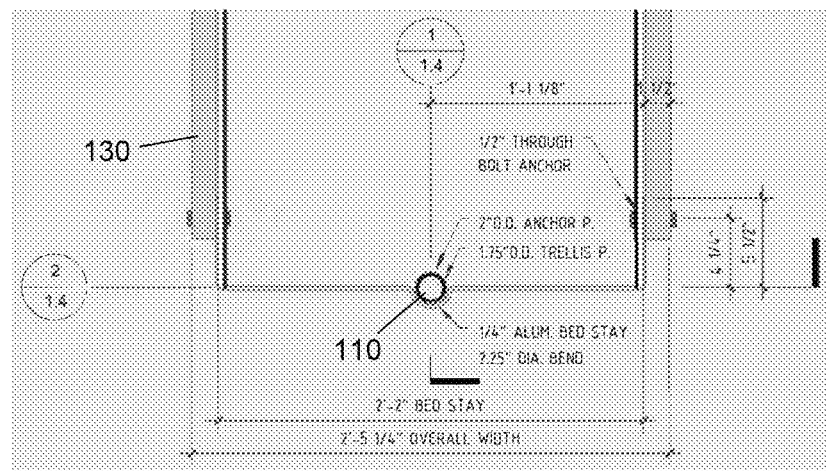
FIG. 7 is a detailed plan view of the apparatus depicted in FIG. 2.
Figure 7:
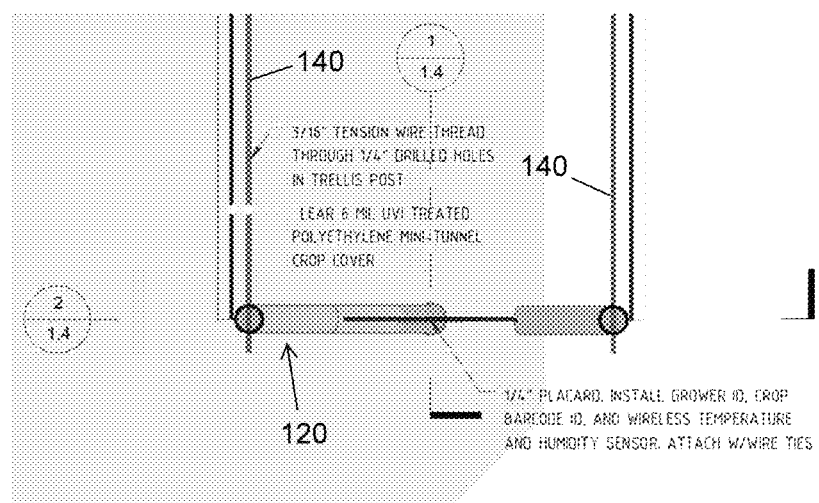

FIG. 4 illustrates additional features of the apparatus 100. The trellis 100 preferably includes an arcuate or curvilinear shape along the top end, which facilitates placement of a covering material 200 over the trellis 100 without tearing or otherwise damaging the material 200. The upper portion of the trellis 100 is preferably formed in a rounded, tubular shape and made from a material having sufficient strength to withstand natural elements present in the environment.

As shown in FIG. 4, the trellis 100 may comprise a number of perforations or holes 125 for attaching cables, wires 140 or signage 160 and for securing the material 200 described above. Protective material 200 may comprise UV treated polyethylene (approximately 6 mil) sheeting, although other material types and thicknesses are contemplated for use with the lollipop trellis 100. The trellis 100 may also be inserted into an aperture in the frame 130, which makes up a portion of the bed or box described above, and which may be complemented by the use of anchor element 150 described above. Further details regarding the lollipop trellis 100, according to a preferred embodiment, are shown in FIGS. 5-8B.

Another apparatus according to one embodiment is shown in FIGS. 9-17. This apparatus 300 may be used in lieu of or in addition to the lollipop trellis 100 described in detail above. This apparatus 300 generally serves to shield underlying agricultural crop from inclement weather, birds, rodents, insects, etc. The apparatus 300 shown in FIG. 9 preferably comprises a riser portion 310 and supporting arms 320 extending from the top of the riser portion 310, which may be oriented in different directions or modified in length in a similar manner as the lollipop trellis 100 described above. Although two supporting arms 320 are shown, the apparatus 300 may have fewer or greater number of arms 320.

Figure 9:
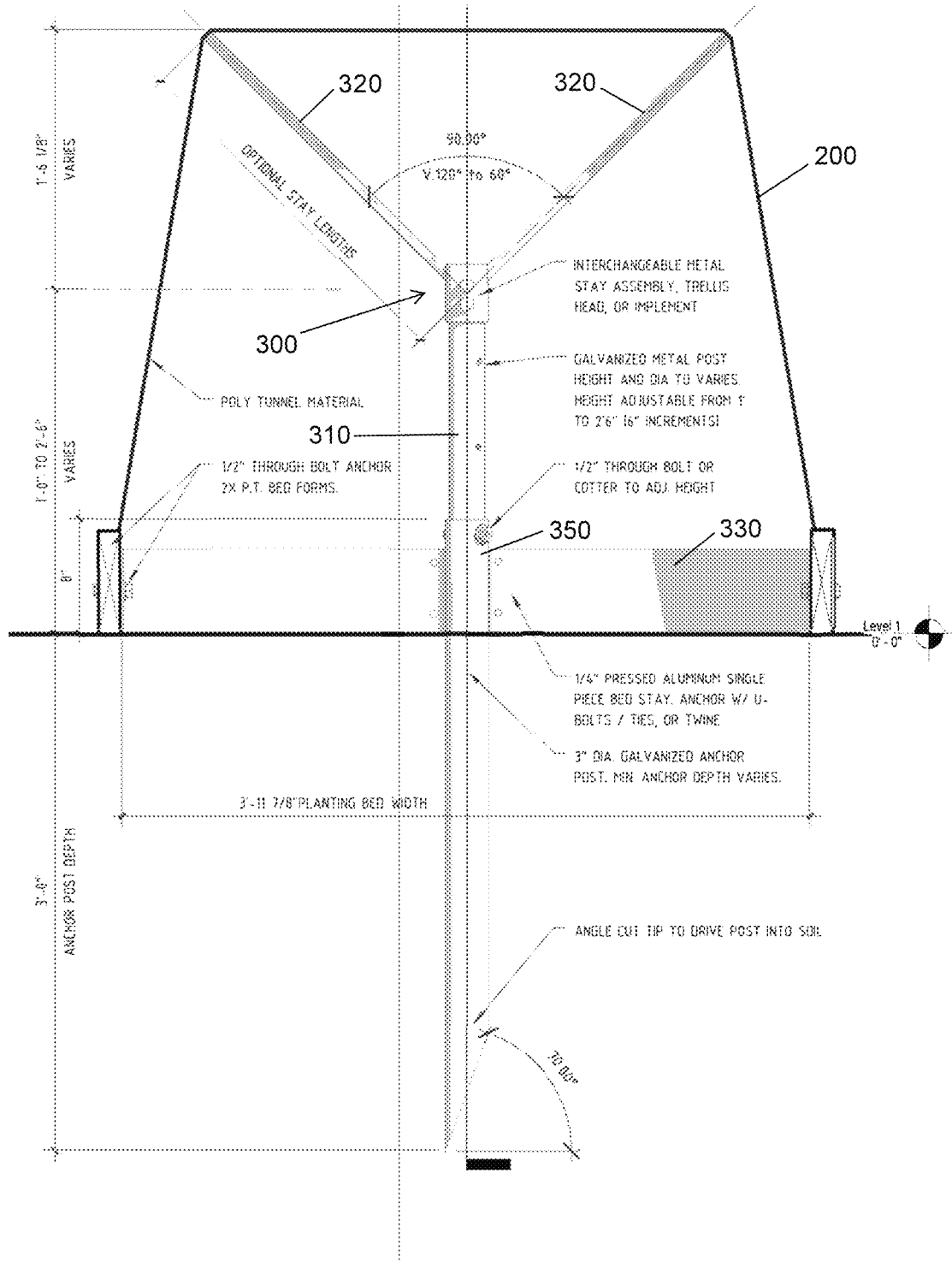
FIG. 9 is a detailed schematic view of apparatus for enhancing cultivation and production of agricultural crops according to another embodiment.

In one embodiment, the apparatus shown in FIGS. 9-17 creates a "tunnel" beneath the supporting arms 320 of each apparatus 300, by supporting a material layer 200 suspended over each bed or box and preferably secured to the frame 330 of each box, which may be augmented by the use of an anchor element 350, as shown in FIG. 9.

The material 200 supported by the apparatus may be a clear, UV treated polyethylene sheet permitting sunlight to penetrate the material 200. The material 200 may be fastened to the apparatus shown in FIGS. 9-17 in the same or similar manner as described above with respect to the trellis 100, in order to prevent the material 200 from becoming displaced due to wind or other weather elements, or from pests such as birds, rodents and other animals.

Figure 10:
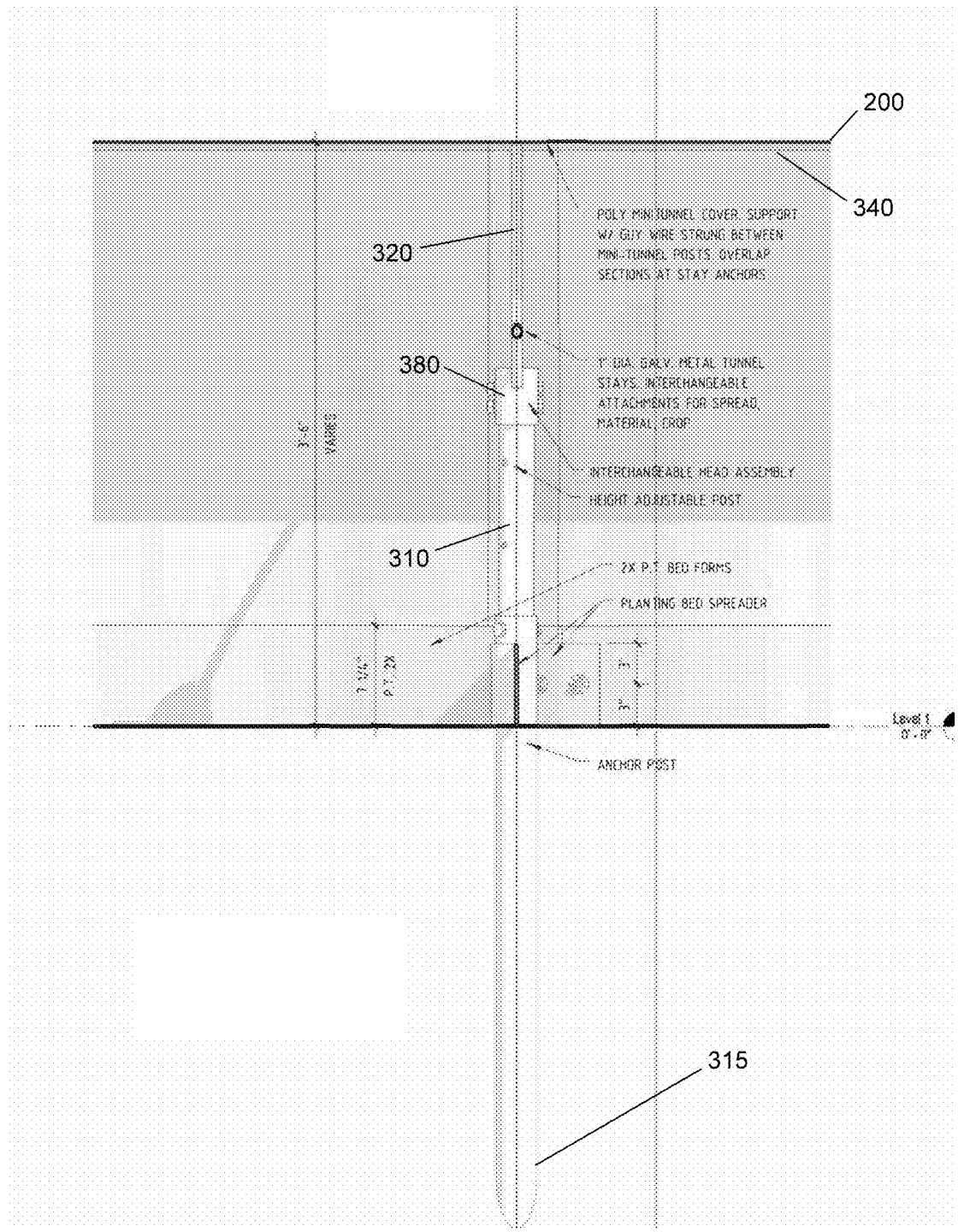
FIG. 10 is a detailed side elevation view of the apparatus depicted in FIG. 9.
Figure 11:
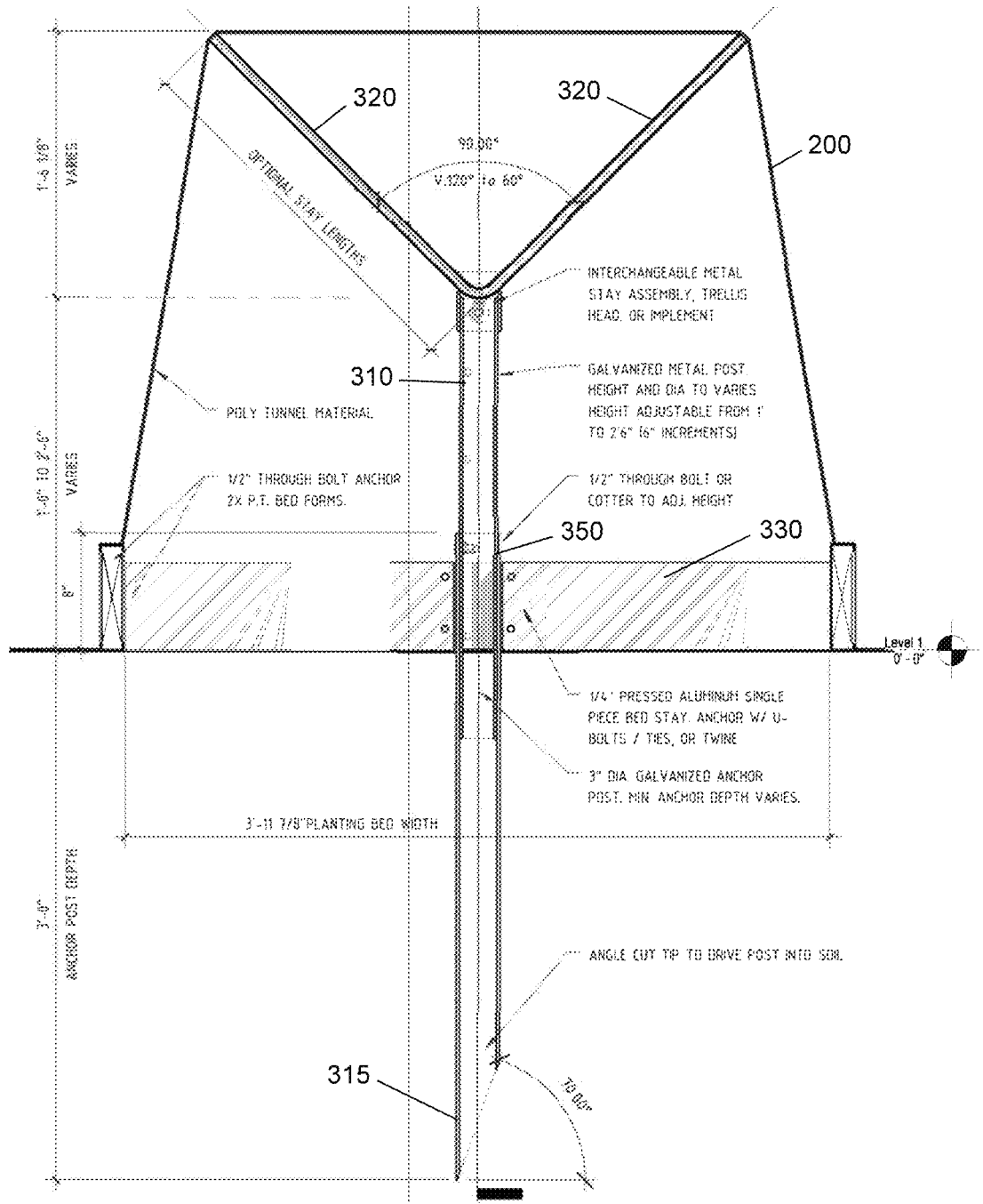
FIG. 11 is a detailed front elevation view of the apparatus depicted in FIG. 9.
Figure 12:
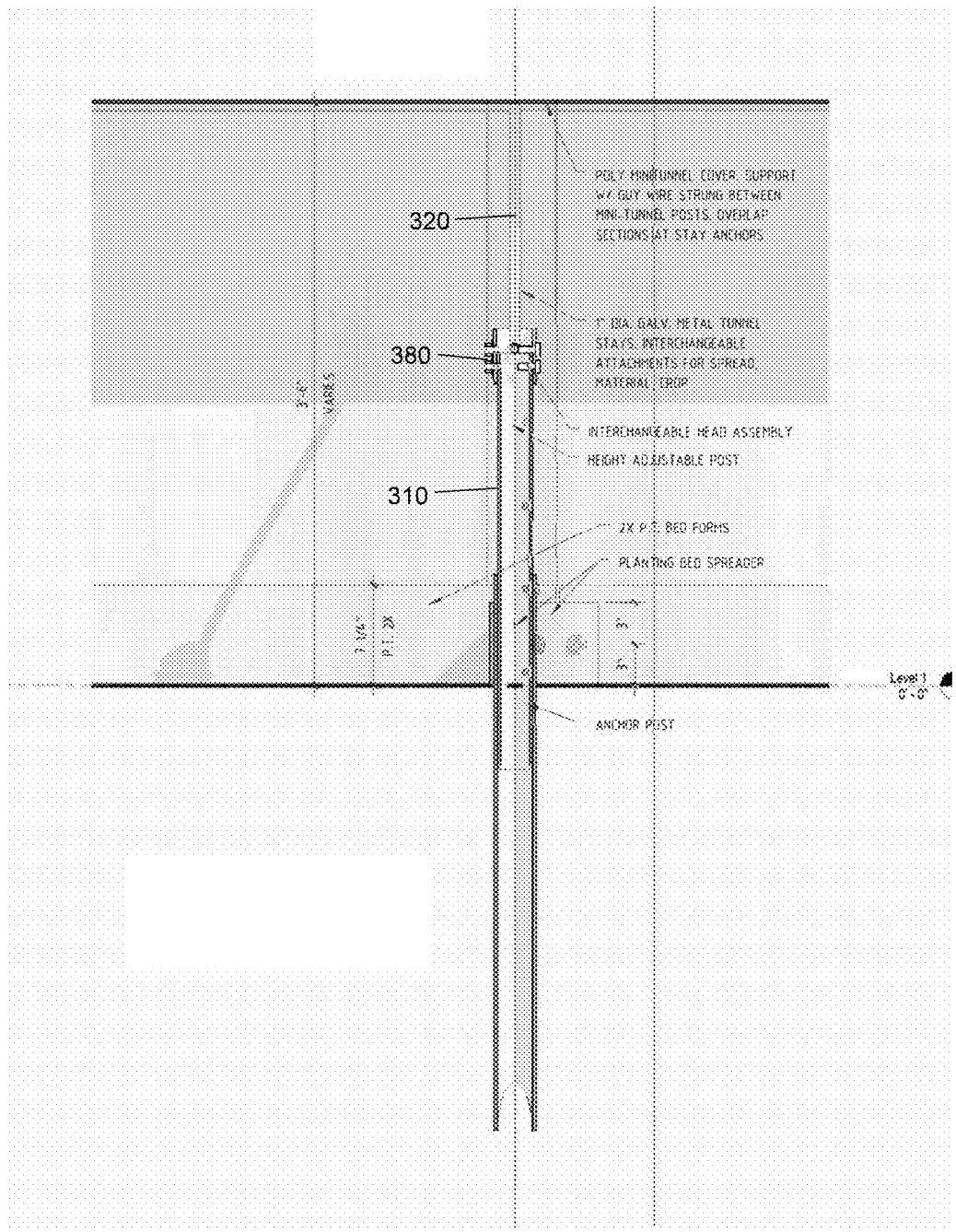
FIG. 12 is another detailed side elevation view of the apparatus depicted in FIG. 9.
Figure 13:
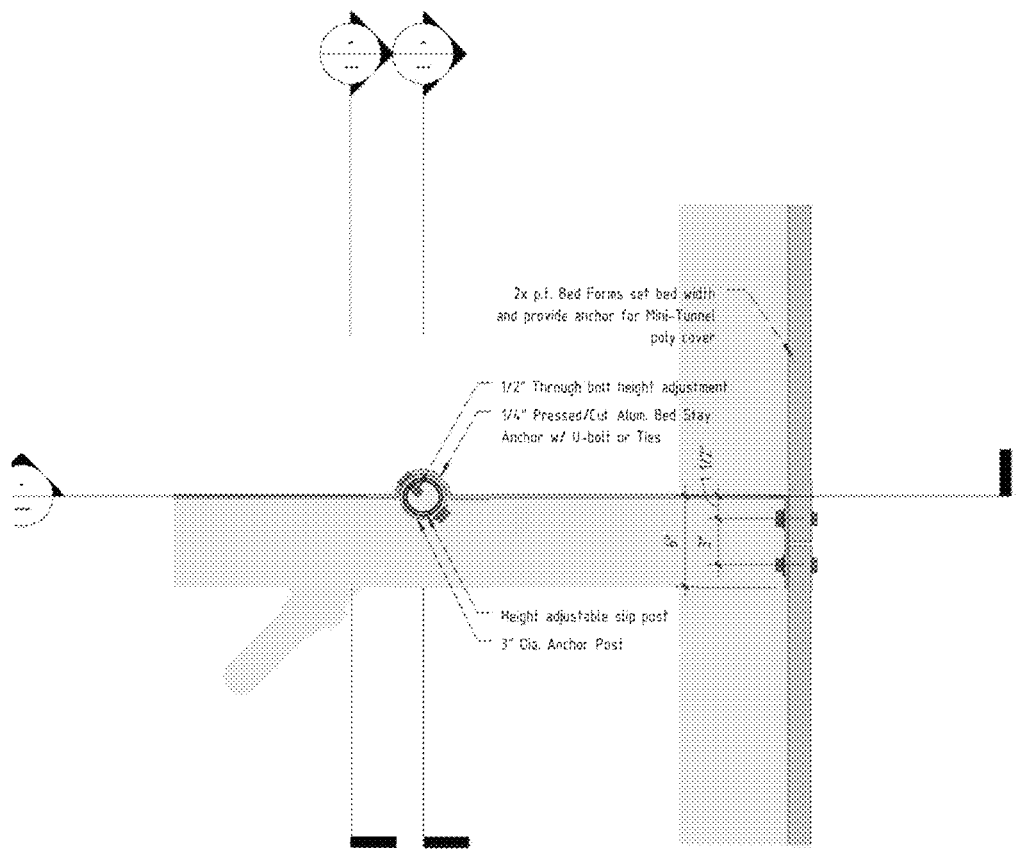
FIG. 13 is a detailed plan view of the apparatus depicted in FIG. 9.
Figure 14:
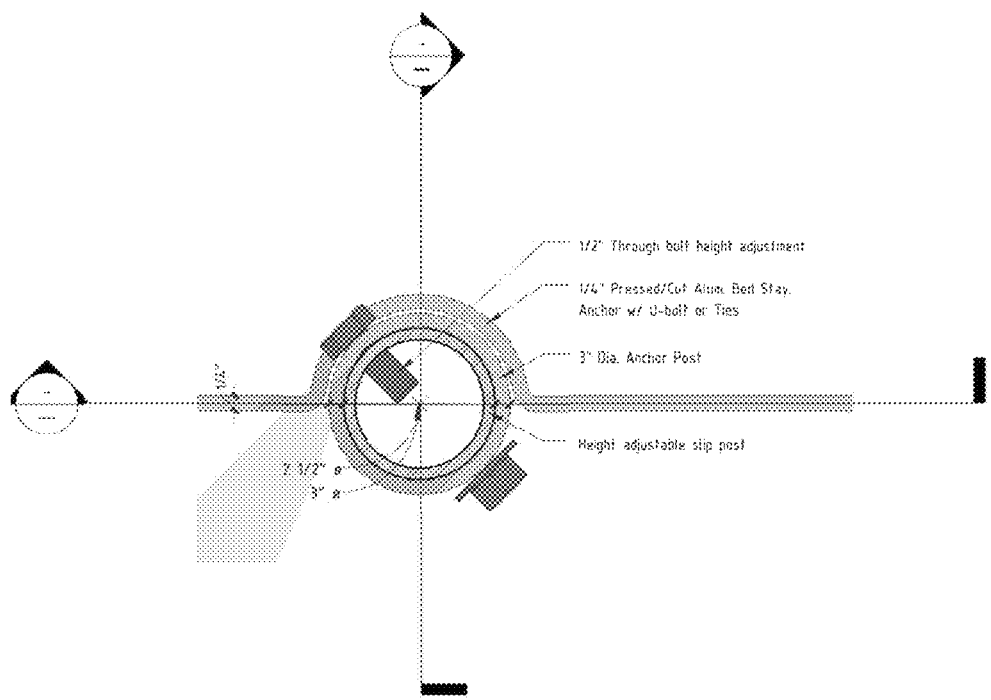
FIG. 14 is another detailed plan view of the apparatus depicted in FIG. 9.
Figure 15:
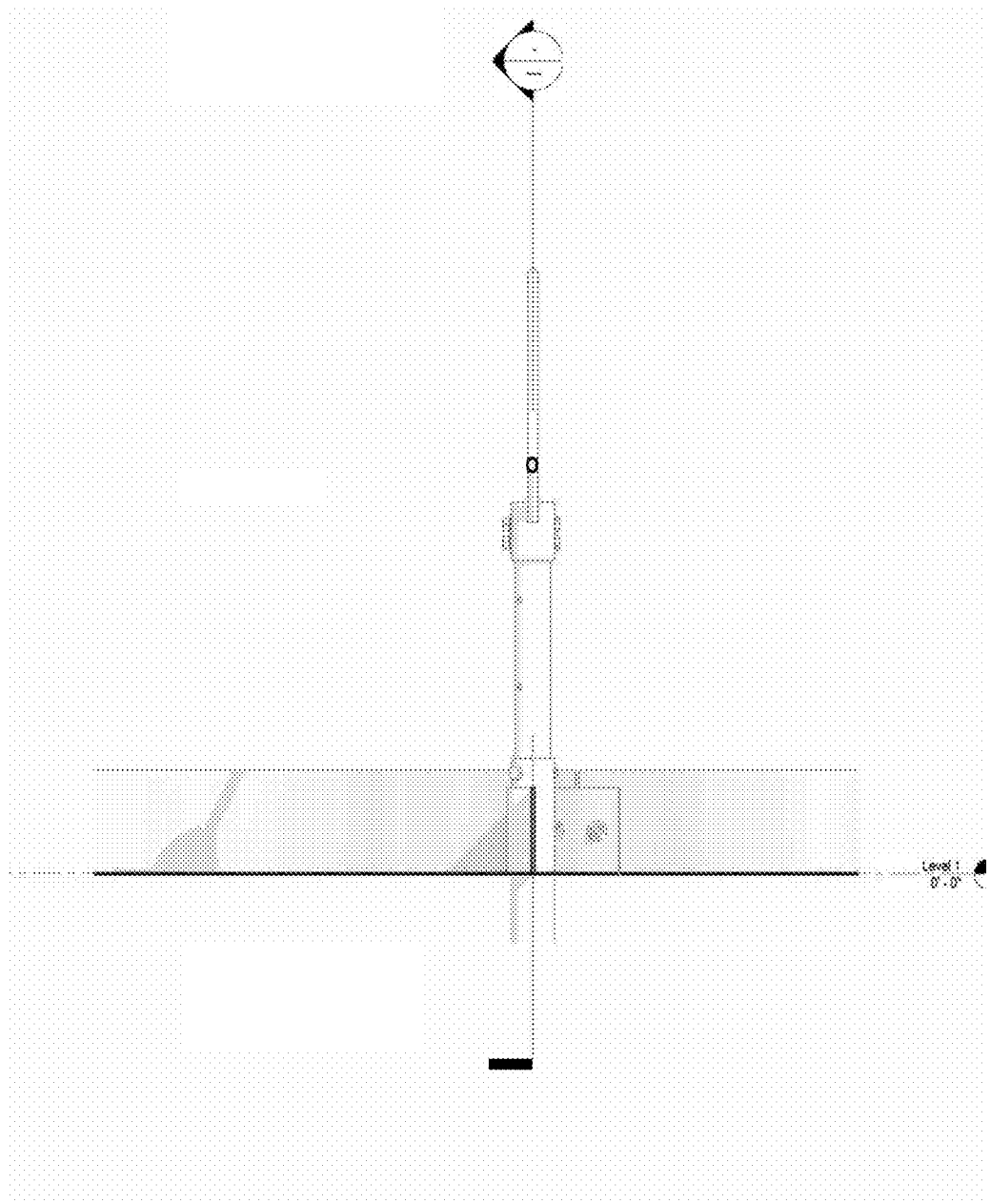
FIG. 15 is another side elevation view of the apparatus depicted in FIG. 9.
Figure 16:
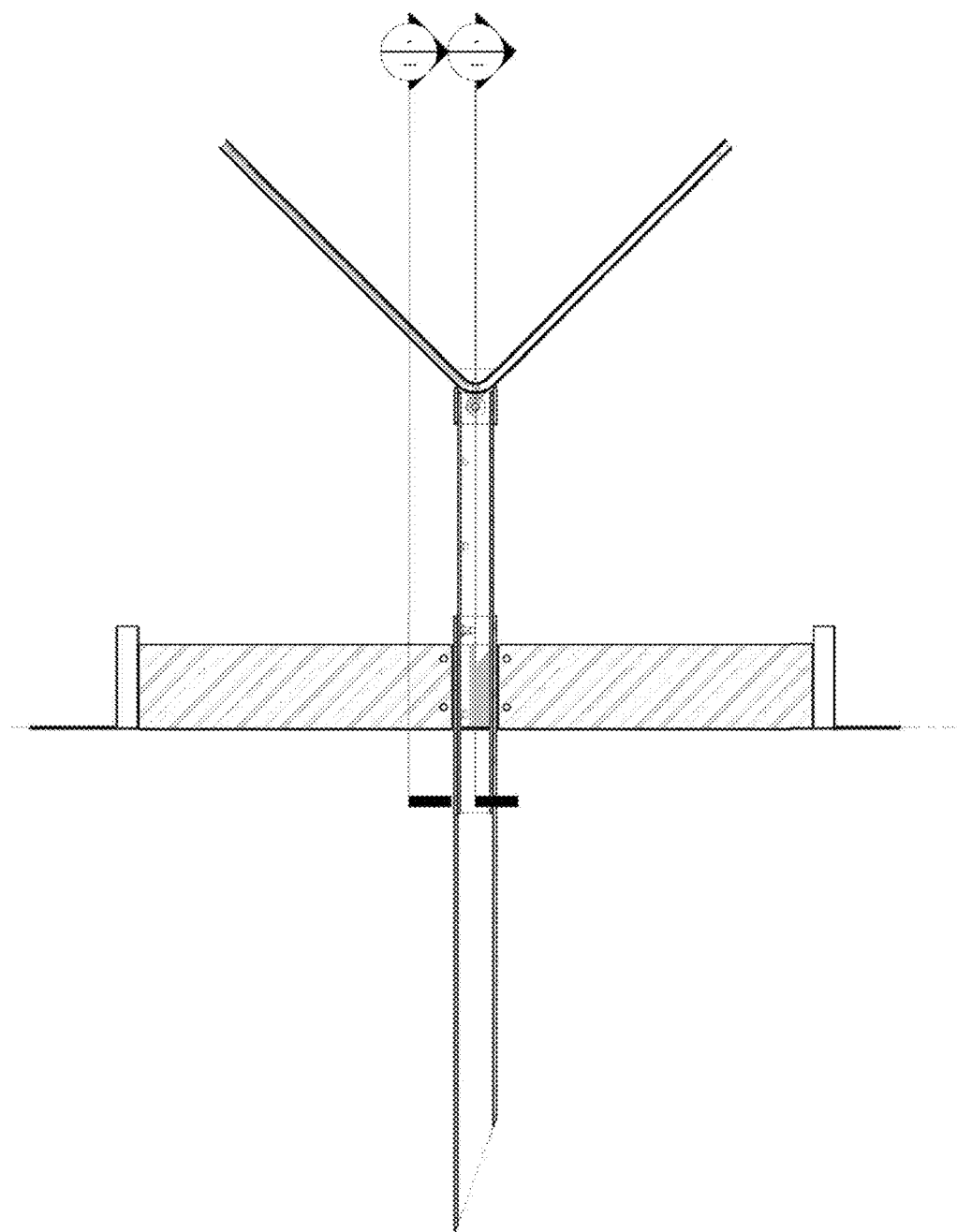
FIG. 16 is another front elevation view of the apparatus depicted in FIG. 9.
Figure 17:
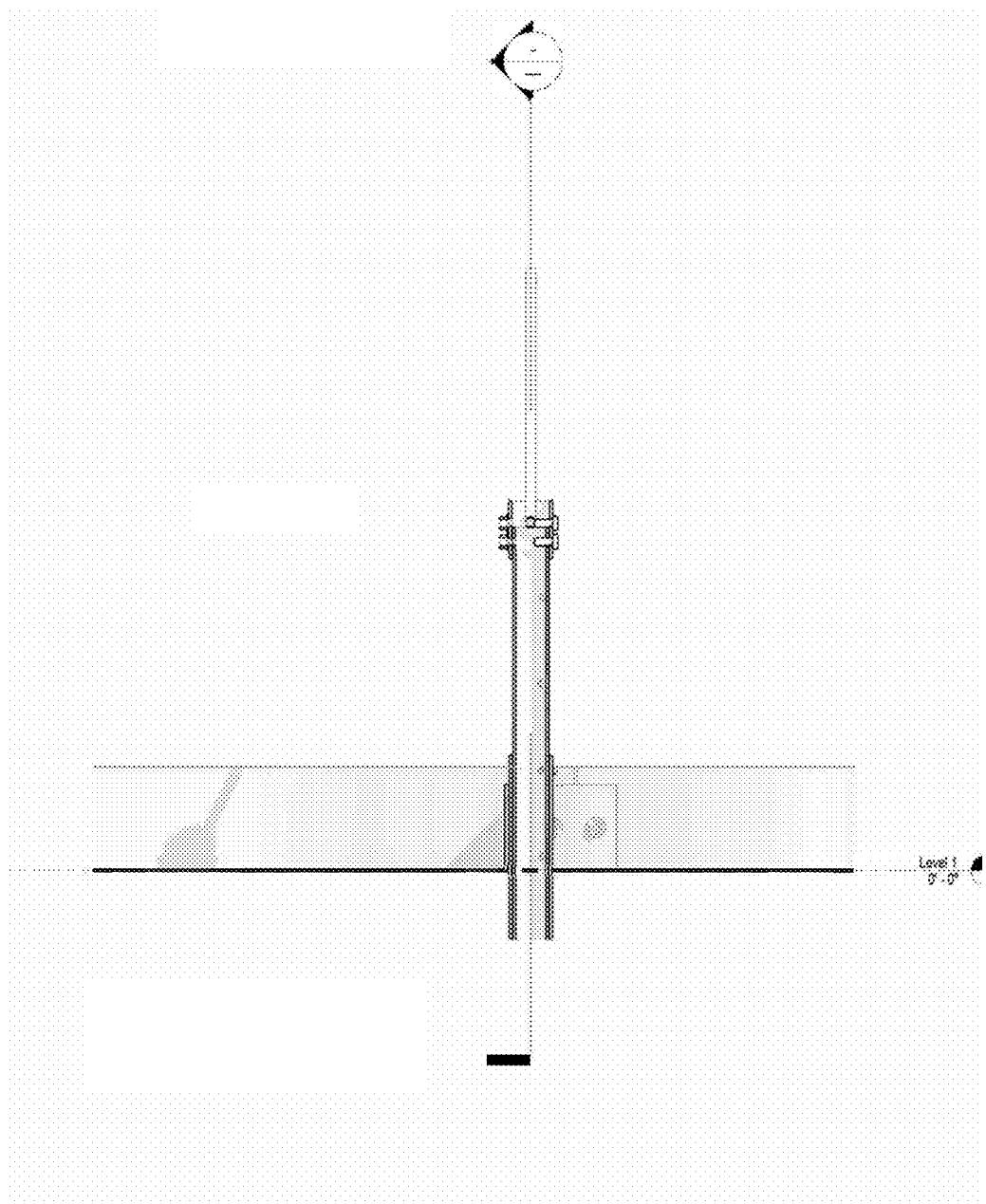
FIG. 17 is another side elevation view of the apparatus depicted in FIG. 9.

Referring now to FIG. 10, the apparatus 300 may further comprise a head assembly 380 for interchanging or replacing arm supports 320 of the apparatus 300. The apparatus 300 may also be height adjustable in the same or similar manner described above for the lollipop trellis 100. Wires or cables 340 may be tensioned between each apparatus 300 in a given row for supporting signage 360 or material covering 200. The apparatus 300 preferably comprises a spike or sharp distal end 315 for inserting into the underlying ground, and may be tubular and fabricated from various different materials, including steel, steel alloy, aluminum, aluminum alloy, chrome, graphite, carbon-reinforced materials, plastics, and other materials both natural and synthetic. In one embodiment, the material is substantially recyclable and may be made from substantially naturally occurring materials. Variations of this apparatus, including different features not discussed above, are shown in FIGS. 11-17.

Whether using the apparatus of FIGS. 1-8B or FIG. 9-17 (or in certain embodiments, neither), each bed or box may receive water, preferably via irrigation lines attached to each bed, as well as fertilizer, nutrients, insecticides, etc. while cultivating the crop planted within each bed. In preferred embodiments, the irrigation lines are connected to pumps and similar apparatus for controlling flow of water, fertilizer, nutrients, insecticides, etc. automatically and/or remotely, either by the user scheduling activities through the application (described in greater detail below) or by signaling the system to activate one or more pumps associated with the apparatus. In a preferred embodiment, an array of irrigation lines may be coupled to, by way of example, a control box housing solenoids and other electromechanical controls for regulating distribution of water to each bed. In a preferred embodiment, the application described below permits a grower to view (passively) or change (actively) the watering cycles for any of the beds located in his or her field(s) from a mobile device or mobile computer.

According to one embodiment, the trellises 100 are substantially hollow and permit further irrigation lines to be placed through the tubular body of the trellis 100. Thus, water may be distributed not only to the bed, but also to the crop as it continues to grow. Each trellis 100 may further comprise diffusers 104 or other outlets for dispersing water among the crops.

Fertilizer and nutrients may be distributed in a similar manner. For example, fertilizer may be distributed directly to the soil located in the beds, or alternatively may be delivered via irrigation lines or alternative lines dedicated for delivery of fertilizer. The same or similar delivery methods may be used for delivering nutrients or insecticides, for example. Each line attached to the beds may include a quick connect/disconnect for adjusting location, cleaning the assembly, etc., or may be transferred to different beds between harvest seasons or as needed during the same growing season. In other embodiments, the lines are dedicated to a particular row or box and are only disconnected when the cultivation and harvesting of crops is complete.

FIGS. 18-21 depict various views of a combined farmhouse, production area and living space according to various embodiments of the present disclosure. This facility is preferably in very close proximity to the farm site and facilitates harvest and production of food stores created by the activities described above.

Figure 18:
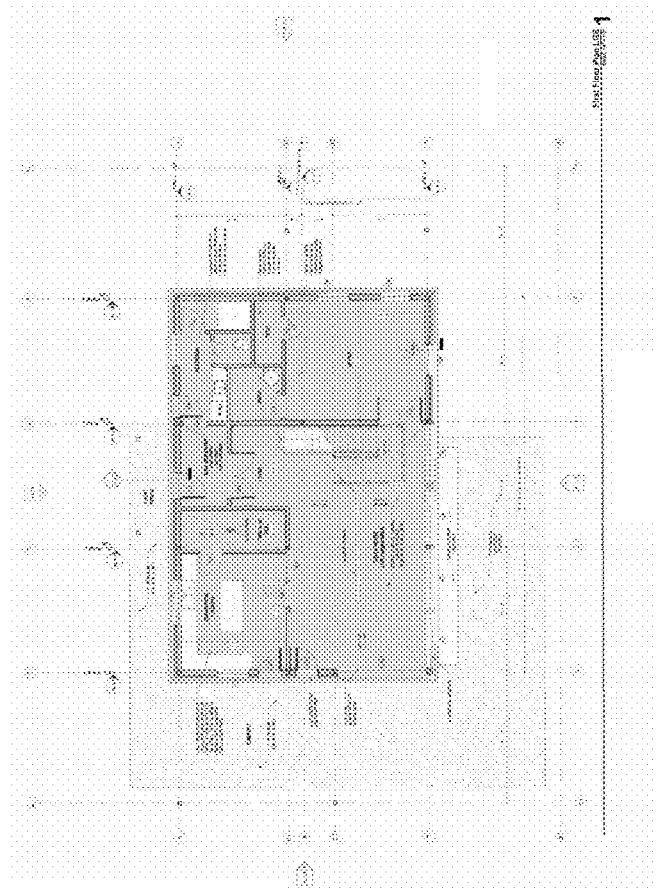
FIG. 18 is a detailed plan view of combined living, food production and storage facility according to one embodiment.

Referring now to FIG. 18, a plan view of the facility is shown. In a preferred embodiment, the facility comprises a greenhouse area for growing crops or plants that require more consistent temperatures, or that otherwise cannot survive the climate change of the outdoor farm site. Although not shown in FIG. 18, the plan may also include an abattoir, or alternatively an indoor/outdoor livestock area, including but not limited to a chicken coop. In one embodiment, the greenhouse area of the facility is multi-story, and preferably is adjacent a south or southwest facing elevation.

Adjacent the greenhouse is a commercial kitchen and/or food preparation area, with equipment and storage for food and crop produced by the farm site. The kitchen preferably includes a walk-in refrigerator and/or freezer for longer-term storage. The kitchen also preferably includes an outdoor entry/exit so that food production is adjacent the parking pad or otherwise convenient for commercial vehicles to arrive and load produce from the farm site.

The plan in FIG. 18 may also comprise a number of mixed use spaces or equipment spaces, such as a multimedia or office space, an entry/mudroom, a full or partial bathroom and meeting rooms as desired. Although approximate square footages and dimensions are provided in FIG. 18, it is understood that variation to these dimensions may occur without departing from the spirit of the present disclosure.

Figure 19:
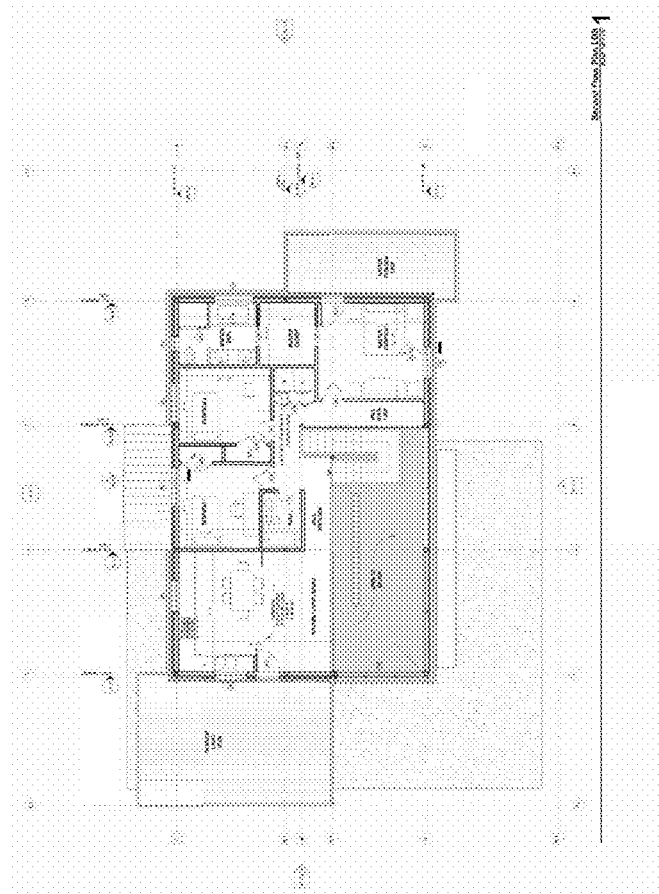
FIG. 19 is another detailed plan view of combined living, food production and storage facility according to one embodiment.

Referring now to FIG. 19, a second floor plan of the facility is shown according to a preferred embodiment. The second floor plan may include living spaces for the growers/farmers operating the food production facility, and can be increased or decreased to accommodate the number of individuals who will reside at the farm site for some or all of the growing season. In certain embodiments, additional rooms may be made available for seasonal or migrant workers, such as would be needed during harvest on larger farm sites. The second floor plan may also include, as shown in FIG. 19, a full residential kitchen, one or more full or partial bathrooms, closets, walkways, decks, etc.

Figure 20:
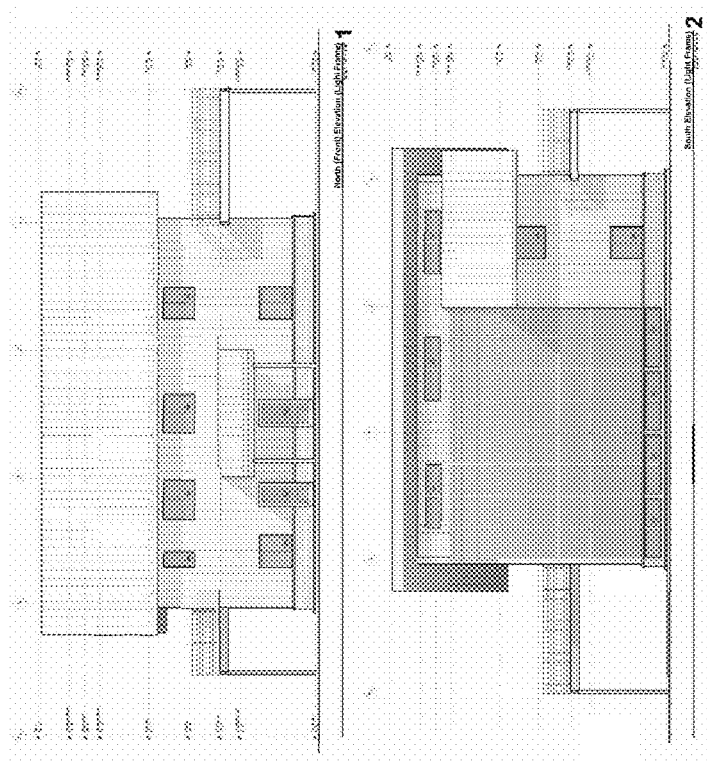
FIG. 20 is a front and rear elevation view of combined living, food production and storage facility according to the embodiment shown in FIGS. 18 and 19.
Figure 21:
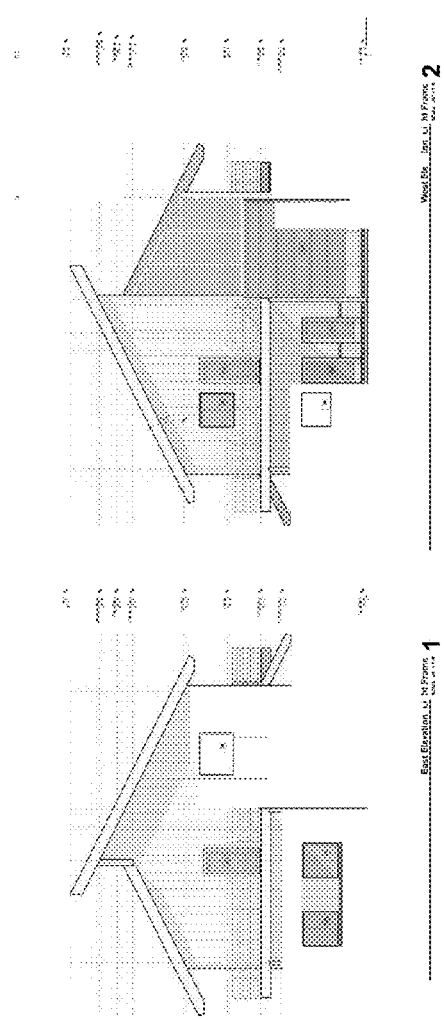
FIG. 21 includes side elevation views of combined living, food production and storage facility according to the embodiment shown in FIGS. 18 and 19.

The building type may be residential, commercial, or a combination of both. In one embodiment, the building may be rated type IIB, and have a substantially steel frame construction with curtain wall exteriors (i.e., SIPS or LGS Framed). The facility may also be fire-rated according to IBC sections 302, 306.2, 310.4, 310.5 and 601.1. In certain embodiments, portions of the facility may be rated F-1 for factory or industrial use, including as needed to permit food processing, butchering, baking, packaging and other light industrial uses necessary to process the foods produced from the crops. Additional views of the structure, including elevation views, are shown in FIGS. 20-21.

In certain embodiments, the facility may be modified to include a storefront or café, or a farmer's marketplace for people interested in coming to the facility to purchase produce and other foods produced at the facility. In another embodiment, the facility may also include a restaurant for dining, either open to private functions or to the public in general. The availability of the food produced from the farm site, in combination with the full commercial kitchen and walk in refrigerator/freezer allows the operator of the restaurant with the flexibility to offer locally grown foods as part of a full, season-wide menu.

The building materials and insulation provided with the facility is preferably suitable for the climate, including wind and snow loads, fire hazards, flood hazards, average daily temperatures, etc. For example, the walls may have a minimum R-value of approximately 20, while the windows and skylights have a U-Factor of approximately 0.35 and 0.60, respectively.

The foundation is preferably slab on grade with 30" depth footing, and includes reinforcing for steel frame anchorage. The slab on grade will preferably accommodate wash drains in the main food production work area, and commercial floor sinks in the kitchen space. The foundation is preferably insulated up to the first floor level to approximately R10 with a vapor barrier.

Thermal performance and condensation for such facilities is also a primary consideration. For example, the curtain wall in the greenhouse may cause either heat or cooling problems during the course of seasonal weather fluctuations, due in part to the window wall's poor thermal performance. In this regard, the facility is preferable built according to the high standards of current LEED building certifications, including by tightly sealing the structure and providing a high performing slab on grade, exterior wall, and roof system. The facility may also include a radiant heat system and/or ERV heat pump system to alleviate cooler conditions during the fall and winter. Condensation concerns may be mitigated with a continuous exterior membrane.

The facility is preferably suited for low-voltage LED lighting systems, including pre-wire for numerous exterior lighting locations difficult to retrofit into structure. The facility also includes a hub or data center for enhanced wireless connectivity, and may further comprise one or more home automation devices and/or control centers to monitor and control security, (motorized) window ventilation, HVAC systems, lighting, fire communications and emergency contact.

According to one embodiment, the apparatus 400 comprises a frame supported by a plurality of wheels, and which is advantageously dimensioned to fit between the rows in a field (such as the field and rows depicted in FIGS. 1 and 2). The apparatus 400 preferably comprises a frame designed to closely match the size and orientation of the bed or box described above, such that material may be delivered to a particular bed or box by use of the apparatus 400, or crop may be harvested from the bed or box and transported to the production facility. In various embodiments, the apparatus 400 may comprise one or more dampening members, such as springs, dampers, shocks or similar devices to assist with loading and unloading of the apparatus 400 with material and/or crop.

In one embodiment, the apparatus 400 comprises a handle and associated stand for transporting the apparatus 400 manually from the field to the facility and back to the field. In other embodiments, the apparatus 400 may be motorized and substantially controlled by automated means, such as with servo-controlled motors with associated control logic. In one embodiment, the apparatus 400 further comprises computational machinery to program the apparatus for routine transport to and from the field and specific beds or boxes located therein.

In another embodiment, a track or rail is provided in locations adjacent the rows of beds to permit the apparatus 400 to travel thereon. The track or rail may also be automated or semi-automated such that the apparatus 400 is configured to make required stops for delivery and/or collection from one or more locations in the field. The travel pattern and frequency of travel may be controlled by the user via the application described herein. Variations on these different embodiments is contemplated and considered within the spirit and intent of the present disclosure.

In other embodiments, the apparatus 400 may comprise an RFID reader or other device for identifying and locating tags or nodes associated with beds in the field. For example, the apparatus 400 may be programmed to transport material to select beds, based on the proximity to the RFID tag associated with one or more beds. In this manner, a single grower may be tasked with different activities in a field, and the apparatus 400 programmed to repeatedly deliver material to certain beds (given the data registered by the RFID reader identifying RFID tags), and then return to the facility for further loading and unloading. This in turn permits the grower to work in the field without repeated trips back and forth to the facility to retrieve materials. In one embodiment, several of this type of apparatus 400 may be employed simultaneously to achieve even greater efficiency when planting, cultivating or harvesting agricultural products.

According to one embodiment, the apparatus described herein may comprise one or more photovoltaic arrays associated therewith for collecting and/or distributing supplying solar power. In another embodiment, the autonomous collection and production apparatus described herein may be an airborne apparatus, such as a drone, and may assist with delivery and/or collection of various material to/from the Steward Farm. In this embodiment, the airborne apparatus may be fully autonomous and programmed for certain tasks at certain times, or may be semi-autonomous and configured to receive at least certain commands from the user through, for example, the application described herein.

In one embodiment, the foregoing detailed description provides systems and methods for enhanced cultivation, harvest and production of crops, which encompass a variety of foods. In one embodiment, the crops are largely based on annual planting, such as crop grown from starts or seeds planted every year. In varying embodiments, crops grown by the systems and methods described herein include one or more of the following: Lettuces (all varieties including Cauliflower, Cabbages, Kale, Spinach, Bok Choi, Chard, Collard Greens, Cilantro, Other); Tubers (Potatoes, Carrots, Beets, Other); Tomato Varieties (Heirloom and Other); Wheats and Grasses; Beans; Cucumber; Beets; Peppers; Radishes; and Corn. The crops grown according to the systems and methods described herein may also include perennials, which are defined as long term crops and may require years to mature. Such perennial varieties include the following: Vine-based (including all grape varieties); Orchard (Citrus, Apple, Peach, Other); Nuts; Berry Shrubs (Black, Blue, Boysenberry, Raspberry, Other); Hops; and other Fruits (including fruit varieties trellised for greater yields).

In embodiments, the systems and methods account for planning and strategy associated with crop rotation, which may be necessary from year to year and greatly impacts planting layout, irrigation, soil amendment, fertilization, etc. In one embodiment, the grower is provided with data for each bed or box relating to the agricultural yield, growth rate, soil condition, terrain condition, and other information in order to make an informed decision when and how to best rotate crop planted in the beds of a given field.

In other embodiments, the grower or farmer may also plant and cultivate specialty crops, including those unique to the specific community or area where the field is located, and in certain instances to meet current consumer demand for such crop. In other embodiments, the grower or farmer may also plant and cultivate contract crops for specific customers or food production enterprises.

Although the embodiments described above relate typically to cultivation of agricultural crops, it is expressly understood that animals and livestock may also be cultivated using the systems and methods described here. For instance, the facility may accommodate the growth and use of chickens, goats, cattle, horses and other animals as desired. The facility described above may also comprise stables, pens, coops, yards, and grazing areas to support such cultivation. Subsequently, eggs, milk, cheese and other food production may be achieved by the grower or farmer.

Harvested crop can be preserved, packaged and made ready for distribution in several ways. In general, any crop intended for sale and consumption must meet local health safety standards, and be prepared in a facility designed for preparing food, such as found in the commercial kitchen described above. Any production room requires specific plumbing and work surfaces that can be thoroughly cleaned and disinfected to avoid potential spoilage. Most all produce identified herein may be dressed and prepared here for any of the following preservation methods.

In one embodiment, the facility permits product to be canned, which is typically done in the commercial kitchen, by way of using either metal or glass containers to seal food products therein. In one embodiment, the facility includes a small canning machine for beers, juices, sauces, stewed vegetables, legumes, pickles, etc.

In one embodiment, food products may be frozen, including by way of vacuum sealing fresh produce, packaging that produce, labeling that produce, and storing in the walk-in freezer.

Food drying and/or dehydration may also be employed in the facility, which permits retention of almost 100% of the original nutritional value of the dried produce.

In embodiments described herein, there is further provided an application, such as a mobile application, for gathering and aggregating data related to food-production, cultivation and harvesting of crops and other data sources identified herein, as well as managing numerous different agricultural or food production-related tasks. As described herein, the application program can store and permit access to information that encompasses most, if not all, of the different data sets and tasks that may be developed or employed at a particular farm site. The application further allows data or information to be input and modified by a user as the user completes various tasks.

In one embodiment, computer-readable storage media for managing agricultural activities and having computer-executable instructions embodied thereon is provided. When executed by at least one processor, the computer-executable instructions cause the processor to receive data relating to, by way of example, a specific crop, which may be located in, by way of example, a specific field. The computer-executable instructions also cause the processor to receive, for example, values associated with the crop at a particular date and time. The computer-executable instructions further cause the processor to receive data relating to cultivation and harvest of the particular crop. In an embodiment, the computer-executable instructions also cause the processor to receive data, such as weather, soil or other condition-related data, associated with the field.

Figure 22:
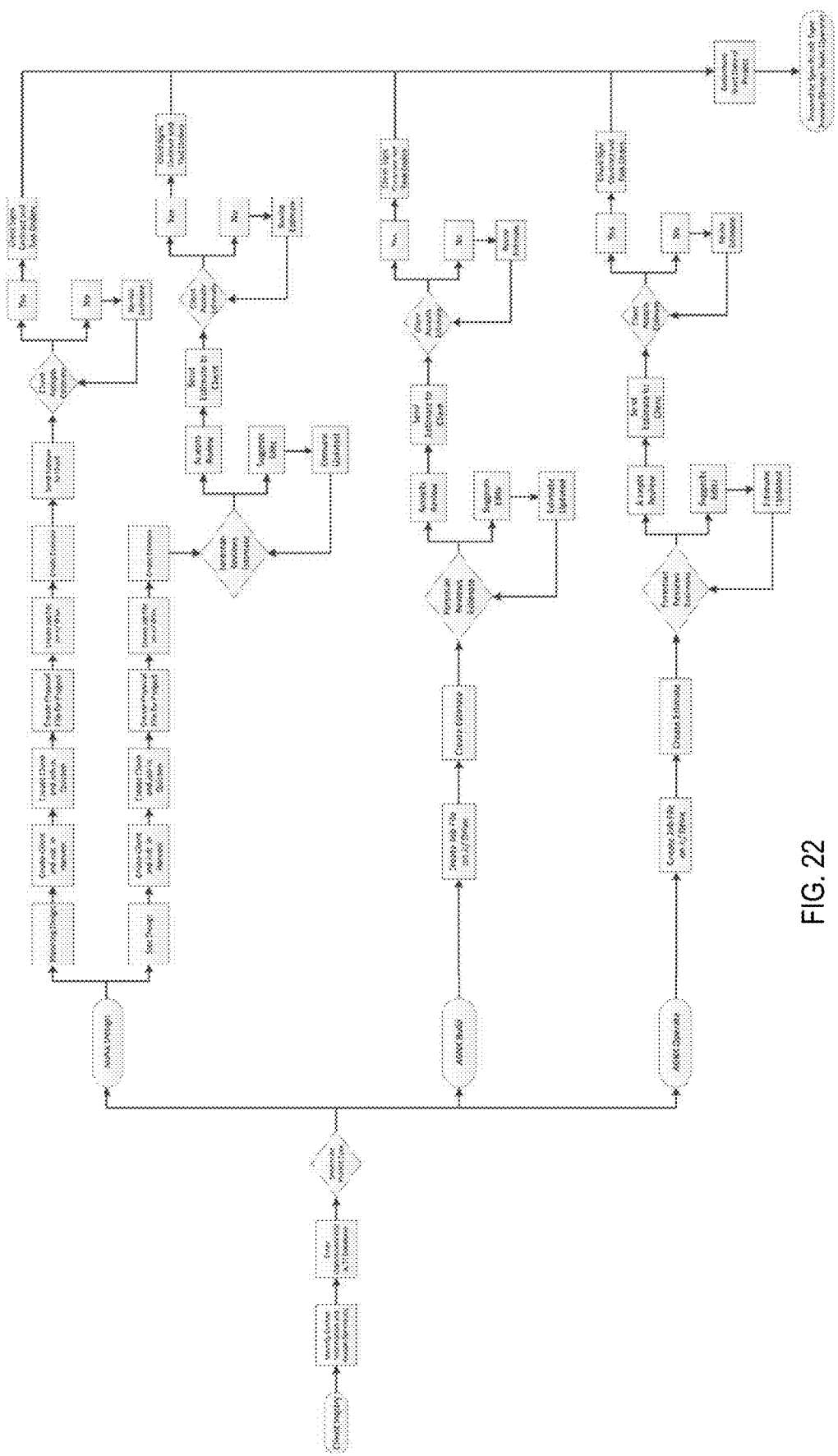
FIG. 22 is a flow chart depicting various processes and methods for enhancing cultivation and production of agricultural crops according to one embodiment.

Referring now to FIG. 22, a flow chart is shown with detailed steps for implementing the systems and methods described herein. In one aspect, the method steps comprise subroutines for planning and design of the farm site, facility and related apparatus and systems needed to achieve the objectives of the present disclosure. In another aspect, certain subroutines are directed to building the field, beds, apparatus, tags/nodes, facility and equipment needed to cultivate and produce the crops desired at a farm site. In yet another aspect, the subroutines are directed to data collection and aggregation, and reporting information to the grower or farmer. Variations on the particular routines and subroutines are considered within the scope of the present disclosure.

The apparatus, systems and methods described herein permit the grower and associated staff to obtain, without delay and from any location on the farm site, the latest and most accurate information required to make daily and other periodic decisions with respect to planning, cultivating and harvesting crop located in the field. In addition to RFID technology described above, individual tags or nodes (e.g., RFID circuits 112) may be used that are field locatable, via one or more mobile devices 114, including non-GPS devices, and using protocols such as Bluetooth, RFID, and WiFi. More specifically, one embodiment of the present invention includes at least one database 116 for storing and retrieving information associated with RFID circuits 112 associated with the trellises, and at least one mobile device 114 comprising specifically configured computational machinery and in communication with the at least one database for displaying information stored in the at least one database.

In other embodiments, indicia and/or barcoded information may be supplied for access with or without a mobile device or mobile computer, and may further be accessible by one or more of the apparatus described above in relation to FIGS. 1-17.

The systems and methods described herein may conveniently provide an intelligent network or web of tags and nodes that may be used to monitor, map and assist in the management of environmental and other resources. Tags or nodes may be embedded in a sign, trellis, tunnel or other apparatus described herein to monitor the air, water and soil for chemicals and pollutants, and detect changes in temperature and pressure. Accordingly, the systems and methods described herein provide real-time data on a variety of circumstances and conditions that impact the environment and food-consuming community, and facilitate the advancement of geology, soil, land management, and agriculture.

A grower may access and manipulate data through the real-time monitoring described herein. As real-time data is populated in the database and provided to the user through the user device, certain fields may be flagged in the application for the user to confirm or observe and enter details through the mobile application. In other settings, a user may provide information to supplement the real-time collection of information obtained by the system.

In one embodiment, a user is provided with an alert that relates to a specific node in the field, which may further assist the user in locating the specific node. In an embodiment, a mobile device user may hear or feel beeps/vibrations or other alerts from the mobile device, which become more frequent as the user becomes closer in proximity to one or more critical nodes or tags in the field. In other embodiments, the application may display a topographical or other map to the user with landmarks present for identifying the specific location of a node or tag that requires direct action by the user. Variations on this embodiment are contemplated with the present disclosure.

The system and application described herein may also be used in food production and distribution. In embodiments, RFIP tags or other tags replace produce labels, price tags and other labels. Price or other labels may be changed en-masse, from any mobile device or mobile computer. Information can be "sent" from RFID tags as well, which permits a user of the system to supply information to a potential buyer, such as a grocer, restauranteur or other purchaser of the goods supplied by the Steward Farm.

In embodiments, an application is provided that may include one or more modules. In one embodiment, the application is designed to operate on a mobile device or mobile computer, and may include a module that assists a grower with data organization. In one embodiment, the application may comprise one or more data sets, tables or databases, including one or more relational databases. In one embodiment, the application includes time and location-specific notifications, and further permits a user to sort, search, modify and manipulate data generated from the apparatus and systems described herein.

The application preferably is configured to run on a computer server or similar computational machinery. The application is also preferable configured to provide alerts based on weather and field-related information. Specifically, the user may define a plurality of thresholds for each of a plurality of alert categories. When field condition data indicates that the thresholds have been exceeded, the user device will receive alerts. Alerts may be provided via the application (e.g., notification upon login, push notification), email, text messages, or any other suitable method. Alerts may be defined for crop cultivation monitoring or conditional alerts, for example, hail size, rainfall, overall precipitation, soil moisture, crop scouting, wind conditions, field image, pest reports or disease reports.

Alternately, alerts may be provided for crop growth strategy. For example, alerts may be provided based on commodity prices, grain prices, workability indexes, growth stages, and crop moisture content. In some examples, an alert may indicate a recommended course of action. For example, the alert may recommend that field activities (e.g., planting, nitrogen application, pest and disease treatment, irrigation application, scouting, or harvesting) occur within a particular period of time.

The application is advantageously configured to receive information on farming activities by, for example, a user's mobile device. Accordingly, alerts may also be provided based on logged farm activity such as planting, spraying, irrigation, scouting, or harvesting. In some examples, alerts may be provided regardless of thresholds to indicate certain field conditions. In one example, a daily precipitation, growth stage, field image or temperature alert may be provided to the user's mobile device.

The application is also preferably configured to generate a plurality of reports. Such reports may be used by the user to improve strategy and decision-making in farming. The reports may include reports on crop growth stage, temperature, humidity, soil moisture, precipitation, workability, pest risk, and disease risk. The reports may also include one or more field definition data, environmental data, field-specific data, scouting and logging events.

According to one embodiment, purchasers of agricultural and food products may be permitted to access information associated with the cultivation and production of products as described above, such that a person or organization may immediately review and purchase products harvested at the Steward Farm site. Specific product may be selected for purchase based on data obtained from the operation of the Steward Farm, which may include photographs and/or video imagery of the specific product as well as information captured by the systems and methods described above. In one embodiment, the application described above may be accessed by a purchaser for determining the products to acquire.

A structure of nodes/tags existing for a given system and represented in the application may be based on what is commonly known as a nodal tree structure. In this embodiment, the owner/operator of the farm site may be considered the top node or top tier of the overall hierarchy. The farm (a/k/a "enterprise") may have one or more children nodes, which may represent tangible (or in some embodiments, intangible) assets. These assets can include buildings, physical structures, crop (both planted and not planted), material (such as insecticides, pesticides, fertilizer, nutrients, seeds, bulbs, nutrients, water, etc.), equipment, apparatus or other tangible items. There may be assets that are related to other assets, such that there may be several tiers or levels of associated nodes.

Processes can be formed from a set of one or more steps or tasks that may be performed with or on a specific asset. All the different nodes of the hierarchical structure can have properties or attributes that identify, describe, and/or configure the different nodes. Each node may be configured such that data may be entered for the different nodes by a mobile device or mobile computer. The data may further be manipulated or acted upon such that enterprise process(es) is configured in the application.

In one embodiment, the application comprises one or more user interfaces, including various user interfaces that comport with the nodal tree data structure and the utilization of the data paradigm described above. The application may be stored or operated on a computing environment, wherein the systems, devices, servers, modules, etc. may execute. As such, the system and components of the system described above may be commodity hardware.

The computing environment preferably includes one or more user computers. The computers may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers may also have any of a variety of applications, including for example, database client and/or server applications, and web browser applications. Alternatively, the user computers may be any other electronic device, such as a thin-client computer, Internet-enabled mobile telephone, and/or personal digital assistant, capable of communicating via a network and/or displaying and navigating web pages or other types of electronic documents. Any number of user computers may be supported.

The computing environment described herein preferably includes at least one network. The network can be any type of network familiar to those skilled in the art that can support data communications using any of a variety of commercially-available protocols, including without limitation SIP, TCP/IP, SNA, IPX, AppleTalk, and the like. Merely by way of example, the network may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers. One server may be a web server, which may be used to process requests for web pages or other electronic documents from user computers. The web server can be running an operating system including any of those discussed above, as well as any commercially-available server operating systems. The web server can also run a variety of server applications, including SIP servers, HTTP servers, FTP servers, CGI servers, database servers, Java servers, and the like. In some instances, the web server may publish operations available operations as one or more web services.

The computing environment may also include one or more file and or/application servers, which can, in addition to an operating system, include one or more applications accessible by a client running on one or more of the user computers. The server(s) may be one or more general purpose computers capable of executing programs or scripts in response to the user computers. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) may also include database servers, including without limitation those commercially available from Oracle, Microsoft, Sybase™, IBM™ and the like, which can process requests from database clients running on a user computer.

The web pages created by the application server may be forwarded to a user computer via a web server. Similarly, the web server may be able to receive web page requests, web services invocations, and/or input data from a user computer and can forward the web page requests and/or input data to the web application server. In further embodiments, the server may function as a file server. Although the foregoing generally describes a separate web server and file/application server, those skilled in the art will recognize that the functions described with respect to servers may be performed by a single server and/or a plurality of specialized servers, depending on implementation-specific needs and parameters. The computer systems, file server and/or application server may function as an active host and/or a standby host.

The computing environment may also include a database. The database may reside in a variety of locations. By way of example, database may reside on a storage medium local to (and/or resident in) one or more of the computers. Alternatively, it may be remote from any or all of the computers, and in communication (e.g., via the network) with one or more of these. In a particular embodiment, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational database, such as Oracle 10i™ or Microsoft SQL Server 2008, which is adapted to store, update, and retrieve data in response to SQL-formatted commands.

The computer system may further comprise hardware elements that may be electrically coupled via a bus. The hardware elements may include one or more central processing units (CPUs); one or more input devices (e.g., a mouse, a keyboard, etc.); and one or more output devices (e.g., a display device, a printer, etc.). The computer system may also include one or more storage devices. By way of example, storage device(s) may be disk drives, optical storage devices, solid-state storage devices such as a random access memory ("RAM") and/or a read-only memory ("ROM"), which can be programmable, flash-updateable and/or the like.

The computer system may additionally include a computer-readable storage media reader; a communications system (e.g., a modem, a network card (wireless or wired), an infra-red mobile device, etc.); and working memory, which may include RAM and ROM devices as described above. In some embodiments, the computer system may also include a processing acceleration unit, which can include a DSP, a special-purpose processor, and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with the network and/or any other computer described above with respect to the computer system. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system may also comprise software elements, including but not limited to application code, within a working memory, including an operating system and/or other code. It should be appreciated that alternate embodiments of a computer system may have numerous variations from that described above. For example, customized hardware might also be used and/or particular elements might be implemented in hardware, software (including portable software, such as applets), or both. Further, connection to other computing devices such as network input/output devices may be employed.

A system operable to execute the user interfaces and methods described above preferably includes a server is in communication with one or more mobile devices through a network. The server can include any hardware and/or software for executing the actions described herein. The server can include one or more components that may represent separate computer systems or electrical components or may software executed on a computer system. These components include a load balancer, one or more web servers, a database server, and/or a database. The load balancer is operable to receive a communication from the mobile device and can determine to which web server to send the communication. Thus, the load balancer can manage, based on the usage metrics of the web servers, which web server will receive incoming communications. Once a communication session is assigned to a web server, the load balancer may not receive further communications. However, the load balancer may be able to redistribute load amongst the web servers if one or more web servers become overloaded.

The one or more web servers are operable to provide web services to the user devices. In embodiments, the web server receives data or requests for data and communicates with the database server to store or retrieve the data. As such, the web server functions as the intermediary to put the data in the database into a usable form for the user devices. There may be more or fewer web servers, as desired by the operator.

The database server is any hardware and/or software operable to communicate with the database and to manage the data within the database. Database servers, for example, SQL server, are well known in the art and will not be explained further herein. The database can be any storage mechanism, whether hardware and/or software, for storing and retrieving data. The database can be as described further herein.

The components of the web server can include hardware and/or software components. In embodiments, the web server includes a discovery web service. The discovery web service is operable to receive a first request from a user device. The first request is mapped to a predetermined web server. Thus, each mobile device is associated with a predetermined one or more web servers associated with the enterprise or organization of the user and/or user device. The discovery web service extracts information from the request, e.g., the user's name, a user's mobile device identifier (e.g., a cell phone number, an Internet Protocol (IP) address, etc.), or some other identifying information. This information is compared to a stored table or other data to match the user device to an assigned web server. If the mobile device is assigned to the web server, the request is passed to the device interface. However, if the mobile device is mapped to another web server, the discovery web service can redirect the request and the mobile device by replying to the request with a redirect message that includes the uniform resource locator (URL) for the other web server. In this way, the system is expandable, as new web servers can be easily added as new enterprises use the system.

The web server can also include a device interface. The device interface is any hardware/software operable to send or receive communications between the web server and the one or more mobile devices. In embodiments, the device interface can be software for creating or receiving web messages in one or more formats or protocols, such as hypertext transfer protocol (HTTP), session initiation protocol (SIP), etc. These messages can be received by the device interface, parsed, and read for the other components of the web server. The information needed by the other components can then be sent to those components. Further, the device interface can receive information from the other components and package the information into a message for a mobile device.

In embodiments, the database may be a local database or remote database. The database can include one or more portions which may be a field in the database. The database can include a data object table and an index table. In embodiments, the data object table stores the one or more objects required for the database. The data object table can include more or fewer objects, which represent parts of the database can further include data and metadata describing the data.

The index table can include metadata and other attributes about the objects in the data object table. Thus, the index table can include a row in the table or index for each object in the data object table. Each row can include an identifier for the object and one or more attributes that describe the object. The attributes can include information or metadata associated with the objects. For example, the attributes can include the information associated with assets, process, etc. as established by the user and described in greater detail above. The attributes can also include other information, such as timestamps, location, user assignments, conditions, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, routines and subroutines may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

The present inventions, in various embodiments, include components, methods, processes, systems and/or apparatuses substantially as depicted and described herein, including various embodiments, subcombinations, and subsets thereof. Those of skill in the art will understand how to make and use the present inventions after understanding the present disclosure. The present inventions, in various embodiments, include providing devices and processes in the absence of items not depicted and/or described herein or in various embodiments hereof, including in the absence of such items as may have been used in previous devices or processes, e.g., for improving performance, achieving ease and\or reducing cost of implementation.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for use with one or more agricultural products, comprising:
    a first trellis assembly comprising:
        a riser portion;
        an anchor portion;
        a head portion;
        a first arm selectively attached to a first side of the riser portion and extendable at an angle tangential to the axis of the riser portion;
        a second arm selectively attached to a second side of the riser portion and extendable at an angle tangential to the axis of the riser portion;
        wherein the head portion comprises a generally oval-shaped, open loop having a plurality of apertures;
        wherein the riser portion comprises a distal end terminating in a spike and the proximal end for receiving the head portion, the first arm, and the second arm;

wherein the anchor portion is selectively attachable to the riser portion and at least one framing member;

wherein the riser, first arm, second arm, anchor, and head portions are separate portions and are rigid, generally tubular and hollow, and are selectively coupled together;

wherein the distal end of the riser portion is attached to the anchor portion and align the riser portion in a horizontal orientation;

wherein the head portion is attached to the proximal end of the riser portion;

a second trellis assembly comprising:
  a riser portion;
  an anchor portion;
  a head portion;
  a first arm selectively attached to a first side of the riser portion and extendable to an angle tangential to the axis of the riser portion;
  a second arm selectively attached to a second side of the riser portion and extendable at an angle tangential to the axis of the riser portion;
  wherein the head portion comprises a generally oval-shaped, open loop having a plurality of apertures;
  wherein the riser portion comprises a distal end terminating in a spike and a proximal end for receiving the head portion;
  wherein the anchor portion is selectively attachable to the riser portion and at least one framing member;
  wherein the riser, anchor and head portions are separate portions and are rigid, generally tubular and hollow, and are selectively coupled together;
  wherein the distal end of the riser portion is attached to the anchor portion and aligns the riser portion in a horizontal orientation;
  wherein the head portion is attached to the proximal end of the riser portion; and wherein a plurality of wires are passed through the plurality of apertures of the first trellis assembly's head portion and extend through a plurality of apertures located on the second trellis assembly's head portion, so that the plurality of wires are in tension between the first trellis assembly's head portion and the second trellis assembly's head portion.

2. The apparatus of claim 1 further comprising a bracing member selectively positionable between the head portion of the apparatus and a second riser portion coupled to the second head portion for stabilizing the apparatus.

3. The apparatus of claim 1, wherein the hollow portion of the riser and head portions are configured to receive one or more fluid delivery lines.

4. The apparatus of claim 3 further comprising a plurality of diffusers for delivering fluid to the area surrounding the apparatus.

5. The apparatus of claim 1 further comprising at least one passive RFID circuit with memory to store information accessible through one or more RFID readers.

6. The apparatus of claim 1 further comprising at least one active RFID circuit with memory to store information accessible through one or more RFID readers.

7. The apparatus of claim 1 further comprising indicia for displaying information associated with the apparatus or its location.

8. The apparatus of claim 7 wherein the indicia is selectively positionable inside the oval-shaped open loop of the head portion of the apparatus.

9. The apparatus of claim 8 wherein the indicia comprises a barcode or other code for storing information associated with the apparatus or its location.

10. The apparatus of claim 5 wherein the information stored on the passive RFID circuit comprises one or more of weather, temperature, moisture content, soil condition, watering schedule, pesticide schedule and harvesting schedule information.

11. The apparatus of claim 1 wherein the head portions are configured to receive and become adjoined with a thin sheet of protective material that may be draped over the apparatus.

12. A system for managing agricultural cultivation, comprising:
  an array of rows for planting one or more agricultural products;
  a series of trellises arranged within each of the rows, wherein each trellis comprises:
    a horizontal riser portion;
    an horizontal anchor portion;
    a head portion;
    a first arm selectively attached to a first side of the riser portion and extending tangentially to the axis of the riser portion;
    a second arm selectively attached to a second side of the riser portion and 10 extending tangentially to the axis of the riser portion;
    wherein the head portion comprises a rigid, generally oval-shaped, open loop having a plurality of apertures for affixing one or more wires;
    wherein the riser, first arm, second arm, anchor, and head portions are rigid, generally tubular and hollow, and are selectively coupled together;
  a RFID circuit associated with each of the trellises for storing and accessing information;
  a fluid delivery line for supplying water to each of the plurality of rows;
  at least one database for storing and retrieving information associated with each of the RFID circuits associated with the trellises;
  and at least one mobile device comprising specifically configured computational machinery and in communication with the at least one database for displaying information stored in the at least one database.

13. The system of claim 12 wherein the at least one mobile device is further configured to access and modify information stored in the database.

14. The system of claim 12 further comprising at least one RFID reader that is configured to communicate with the at least one mobile device for retrieving information from the RFID circuits associated with each of the trellises.

15. The system of claim 12 further comprising at least one valve and at least one pump, which are configured to be activated remotely, associated with the fluid delivery line that is configured to transport water, pesticide, insecticide, herbicide, fertilizer, nutrients, or other materials.

16. The system of claim 12, wherein the database is accessed securely and remotely via at least one network.

17. The system of claim 12, wherein the database comprises historical and planned records relating to at least each of the agricultural products planted in the array of rows during a specific growing season.

18. The system of claim 17 further comprising one or more reports configurable for display through the at least one mobile device.

19. The apparatus of claim 1 wherein the open loop terminates at a free end.

* * * * *